(12) United States Patent
Zheng et al.

(10) Patent No.: US 11,901,648 B2
(45) Date of Patent: Feb. 13, 2024

(54) MULTI-FREQUENCY AND MULTI-BEAM INDEPENDENT ELECTRICALLY ADJUSTABLE ANTENNA

(71) Applicants: FOSHAN EAHISON COMMUNICATION CO., LTD., Foshan (CN); GUANGDONG FUSHUN TIANJI COMMUNICATION CO., LTD., Foshan (CN)

(72) Inventors: Hongzhen Zheng, Foshan (CN); Qiang Zhu, Foshan (CN); Yongchao Lu, Foshan (CN); Guodong Wang, Foshan (CN); Chunhui Shang, Foshan (CN); Yashan Huang, Foshan (CN); Weixiong Qian, Foshan (CN); Chongxuan Deng, Foshan (CN); Yong Yu, Foshan (CN); Yongping Huang, Foshan (CN); Shichao Yang, Foshan (CN)

(73) Assignees: FOSHAN EAHISON COMMUNICATION CO., LTD., Foshan (CN); GUANGDONG FUSHUN TIANJI COMMUNICATION CO., LTD., Foshan (CN)

(*) Notice: Subject to any disclaimer, the term of this patent is extended or adjusted under 35 U.S.C. 154(b) by 0 days.

(21) Appl. No.: 18/318,494

(22) Filed: May 16, 2023

(65) Prior Publication Data
US 2023/0387592 A1    Nov. 30, 2023

(30) Foreign Application Priority Data
May 25, 2022 (CN) .......................... 202210571599.9

(51) Int. Cl.
*H01Q 5/45* (2015.01)
*H01Q 15/23* (2006.01)
(Continued)

(52) U.S. Cl.
CPC ................. *H01Q 5/45* (2015.01); *H01Q 3/32* (2013.01); *H01Q 15/02* (2013.01); *H01Q 15/18* (2013.01); *H01Q 15/23* (2013.01); *H01Q 21/28* (2013.01)

(58) Field of Classification Search
CPC ............ H01Q 5/45; H01Q 3/32; H01Q 15/02; H01Q 15/18; H01Q 15/23; H01Q 21/28
See application file for complete search history.

(56) References Cited

U.S. PATENT DOCUMENTS 10,288,909 B1    5/2019    Youssef

FOREIGN PATENT DOCUMENTS

| CN | 109643839 A | * | 4/2019 | ............... H01Q 1/12 |
| CN | 114050399 A | | 2/2022 | |

(Continued)

OTHER PUBLICATIONS

First Office Action issued in counterpart Chinese Patent Application No. 202210571599.9, dated Jul. 6, 2022.

*Primary Examiner* — Hoang V Nguyen
(74) *Attorney, Agent, or Firm* — Westbridge IP LLC

(57) ABSTRACT

A multi-frequency and multi-beam independent electrically adjustable antenna includes: a first electromagnetic lens, a second electromagnetic lens, a mounting plate, a reflecting plate, oscillator units, oscillator units, and phase shifters. The oscillator units have a higher operating frequency than the oscillator units. The first electromagnetic lens, the second electromagnetic lens, the reflecting plate and the mounting plate are fixed relative to each other. The oscillator units and the oscillator units are all mounted on a reflecting (Continued)

surface of the reflecting plate. The phase shifters are all mounted on the mounting plate. The present application is characterized by simple structure, scientific design, small size, flexible setting of beam direction and etc.

8 Claims, 9 Drawing Sheets

(51) Int. Cl.
*H01Q 21/28* (2006.01)
*H01Q 15/18* (2006.01)
*H01Q 3/32* (2006.01)
*H01Q 15/02* (2006.01)

(56) References Cited

FOREIGN PATENT DOCUMENTS

| | | |
|---|---|---|
| CN | 215896724 U | 2/2022 |
| CN | 216161931 U | 4/2022 |
| WO | WO-2020041467 A1 * | 2/2020 ............. H01Q 1/246 |
| WO | 2021085279 A1 | 5/2021 |

* cited by examiner

MULTI-FREQUENCY AND MULTI-BEAM INDEPENDENT ELECTRICALLY ADJUSTABLE ANTENNA

CROSS-REFERENCE TO RELATED APPLICATIONS

This application claims priority to Chinese Patent Application No. 202210571599.9, filed on May 25, 2022, the content of which is incorporated herein by reference in its entirety.

TECHNICAL FIELD

The present application relates to the technical field of mobile communications, and in particular to a multi-frequency and multi-beam independent electrically adjustable antenna.

BACKGROUND

With the development of mobile communications, Multiple Input Multiple Output (MIMO) technology requires more and more channels of antenna. During use, at least 4 Transmit 4 Receive (4T4R) (four channels) is required to meet the needs of use. The current single lens antenna can only achieve 2 Transmit 2 Receive (2T2R), and cannot meet the use needs of mobile communications. In addition, the technical solution, like the one described in Chinese Patent Application No. 2020106750469, entitled "Dual Vertically Polarized Multi-beam Antenna with Artificial Dielectric Cylinder", cannot adjust a beam down tilt angle of an antenna, which is extremely inconvenient to use. In addition, in some current lens antennas, a beam direction is adjusted by moving an oscillator or electromagnetic lens, which causes the position of the oscillator to be shifted relative to the electromagnetic lens, and a signal of the oscillator to change in direction after passing through the electromagnetic lens. In such a structure, the oscillator or electromagnetic lens must be moved as a whole, and an outer shell for mounting the antenna must have enough space for movement. As a result, the size of antenna is large, which is not conducive to installation and carrying. In a process of practical application, it is difficult to precisely control the beam direction of the oscillator by adjusting a beam direction by moving an electromagnetic wave lens or oscillator, and it is also very inconvenient to conduct.

SUMMARY

The present application aims to provide a multi-frequency and multi-beam independent electrically adjustable antenna. The multi-frequency and multi-beam independent electrically adjustable antenna has advantages of simple structure, scientific design, small size, flexible setting of beam direction, and being able to meet the requirements of an MIMO technology for the number of channels.

A technical solution of the present application is realized as follows. A multi-frequency and multi-beam independent electrically adjustable antenna is provided, which may include: a first electromagnetic lens, a second electromagnetic lens, a mounting plate, a reflecting plate, a first oscillator unit to a thirty-second oscillator unit A1 to A32, a thirty-third oscillator unit to a fortieth oscillator unit B1 to B8, and a first phase shifter to a twelfth phase shifter C1 to C12.

The reflecting plate is bent to form a first reflecting surface, a second reflecting surface, a third reflecting surface and a fourth reflecting surface; the first reflecting surface, the second reflecting surface, the third reflecting surface and the fourth reflecting surface are successively connected to form a wrap angle.

The first electromagnetic lens and the second electromagnetic lens are both cylindrical lenses, the first electromagnetic lens and the second electromagnetic lens are both partially positioned in the wrap angle, and a central axis of the first electromagnetic lens is collinear with a central axis of the second electromagnetic lens.

The first electromagnetic lens, the second electromagnetic lens, the reflecting plate and the mounting plate are fixed relative to each other, and the mounting plate is on a side of the reflecting plate facing away from the first electromagnetic lens and the second electromagnetic lens.

The first oscillator unit to the thirty-second oscillator unit A1 to A32 are oscillators with a same operating frequency, and the thirty-third oscillator unit to the fortieth oscillator unit B1 to B8 are oscillators with a same operating frequency; wherein the operating frequency of each of the first oscillator unit to the thirty-second oscillator unit A1 to A32 is higher than the operating frequency of each of the thirty-third oscillator unit to the fortieth oscillator unit B1 to B8.

The first oscillator unit to the eighth oscillator unit A1 to A8 are all mounted on the first reflecting surface, the first oscillator unit to the eighth oscillator unit A1 to A8 are arranged in sequence along a first straight line L1, each of the first oscillator unit to the fourth oscillator unit A1 to A4 is set to have a signal receiving and transmitting direction towards the first electromagnetic lens and perpendicular to the central axis of the first electromagnetic lens, and each of the fifth oscillator unit to the eighth oscillator unit A5 to A8 is set to have a signal receiving and transmitting direction towards the second electromagnetic lens and perpendicular to the central axis of the second electromagnetic lens.

The ninth oscillator unit to the sixteenth oscillator unit A9 to A16 are all mounted on the second reflecting surface, the ninth oscillator unit to the sixteenth oscillator unit A9 to A16 are arranged in sequence along a second straight line L2, each of the ninth oscillator unit to the twelfth oscillator unit A9 to A12 is set to have a signal receiving and transmitting direction towards the first electromagnetic lens and perpendicular to the central axis of the first electromagnetic lens, and each of the thirteenth oscillator unit to the sixteenth oscillator unit A13 to A16 is set to have a signal receiving and transmitting direction towards the second electromagnetic lens and perpendicular to the central axis of the second electromagnetic lens.

The seventeenth oscillator unit to the twenty-fourth oscillator unit A17 to A24 are all mounted on the third reflecting surface, the seventeenth oscillator unit to the twenty-fourth oscillator unit A17 to A24 are arranged in sequence along a third straight line L3, each of the seventeenth oscillator unit to the twentieth oscillator unit A17 to A20 is set to have a signal receiving and transmitting direction towards the first electromagnetic lens and perpendicular to the central axis of the first electromagnetic lens, and each of the twenty-first oscillator unit to the twenty-fourth oscillator unit A21 to A24 is set to have a signal receiving and transmitting direction towards the second electromagnetic lens and perpendicular to the central axis of the second electromagnetic lens.

The twenty-fifth oscillator unit to the thirty-second oscillator unit A25 to A32 are all mounted on the fourth reflecting surface, the twenty-fifth oscillator unit to the thirty-second oscillator unit A25 to A32 are arranged in sequence along a fourth straight line L4, each of the twenty-fifth oscillator unit to the twenty-eighth oscillator unit A25 to A28 is set to have a signal receiving and transmitting direction towards the first electromagnetic lens and perpendicular to the central axis of the first electromagnetic lens, and each of the twenty-ninth oscillator unit to the thirty-second oscillator unit A29 to A32 is set to have a signal receiving and transmitting direction towards the second electromagnetic lens and perpendicular to the central axis of the second electromagnetic lens.

The thirty-third oscillator unit to thirty-sixth oscillator unit B1 to B4 are all mounted on the reflecting plate, the thirty-third oscillator unit to thirty-sixth oscillator unit B1 to B4 are arranged in sequence along a first side L5 formed by connecting the first reflecting surface and the second reflecting surface, and each of the thirty-third oscillator unit and thirty-fourth oscillator unit B1 and B2 is set to have a signal receiving and transmitting direction towards the first electromagnetic lens and perpendicular to the central axis of the first electromagnetic lens, and each of the thirty-fifth oscillator unit and thirty-sixth oscillator unit B3 and B4 is set to have a signal receiving and transmitting direction towards the second electromagnetic lens and perpendicular to the central axis of the second electromagnetic lens.

The thirty-seventh oscillator unit to fortieth oscillator unit B5 to B8 are all mounted on the reflecting plate, the thirty-seventh oscillator unit to fortieth oscillator unit B5 to B8 are arranged in sequence along a second side L6 formed by connecting the third reflecting surface and the fourth reflecting surface, the first, second, third and fourth straight lines L1, L2, L3, and L4 and the first and second sides L5 and L6 are all parallel to the central axis of the first electromagnetic lens, and each of the thirty-seventh oscillator unit and thirty-eighth oscillator unit B5 and B6 is set to have a signal receiving and transmitting direction towards the first electromagnetic lens and perpendicular to the central axis of the first electromagnetic lens, and each of the thirty-ninth oscillator unit and fortieth oscillator unit B7 and B8 is set to have a signal receiving and transmitting direction towards the second electromagnetic lens and perpendicular to the central axis of the second electromagnetic lens.

The first phase shifter to the twelfth phase shifter C1 to C12 are all mounted on the mounting plate, the first oscillator unit to the fourth oscillator unit A1 to A4 are all electrically connected to an output end of the first phase shifter C1 to form 2T2R, the fifth oscillator unit to the eighth oscillator unit A5 to A8 are all electrically connected to an output end of the second phase shifter C2 to form 2T2R, so that the first oscillator unit to the eighth oscillator unit A1 to A8 form 4T4R; the ninth oscillator unit to the twelfth oscillator unit A9 to A12 are all electrically connected to an output end of the third phase shifter C3 to form 2T2R, the thirteenth oscillator unit to the sixteenth oscillator unit A13 to A16 are all electrically connected to an output end of the fourth phase shifter C4 to form 2T2R, so that the ninth oscillator unit to the sixteenth oscillator unit A9 to A16 form 4T4R; the seventeenth oscillator unit to the twentieth oscillator unit A17 to A20 are all electrically connected to an output end of the fifth phase shifter C5 to form 2T2R, the twenty-first oscillator unit to the twenty-fourth oscillator unit A21 to A24 are all electrically connected to an output end of the sixth phase shifter C6 to form 2T2R, so that the seventeenth oscillator unit to the twenty-fourth oscillator unit A17 to A24 form 4T4R; the twenty-fifth oscillator unit to the twenty-eighth oscillator unit A25 to A28 are all electrically connected to an output end of the seventh phase shifter C7 to form 2T2R, the twenty-ninth oscillator unit to the thirty-second oscillator unit A29 to A32 are all electrically connected to an output end of the eighth phase shifter C8 to form 2T2R, so that the twenty-fifth oscillator unit to the thirty-second oscillator unit A25 to A32 form 4T4R; the thirty-third oscillator unit and thirty-fourth oscillator unit B1 and B2 are both electrically connected to an output end of the ninth phase shifter C9 to form 2T2R, the thirty-fifth oscillator unit and thirty-sixth oscillator unit B3 and B4 are both electrically connected to an output end of the tenth phase shifter C10 to form 2T2R, so that the thirty-third oscillator unit to thirty-sixth oscillator unit B1 to B4 form 4T4R; the thirty-seventh oscillator unit and thirty-eighth oscillator unit B5 and B6 are both electrically connected to an output end of the eleventh phase shifter C11 to form 2T2R, the thirty-ninth oscillator unit and fortieth oscillator unit B7 and B8 are both electrically connected to an output end of the twelfth phase shifter C12 to form 2T2R, so that the thirty-seventh oscillator unit to fortieth oscillator unit B5 to B8 form 4T4R.

The first phase shifter C1 is linked with the second phase shifter C2 through a first push component D1; the third phase shifter C3 is linked with the fourth phase shifter C4 through a second push component D2; the fifth phase shifter C5 is linked with the sixth phase shifter C6 through a third push component D3; the seventh phase shifter C7 is linked with the eighth phase shifter C8 through a fourth push component D4; the ninth phase shifter C9 is linked with the tenth phase shifter C10 through a fifth push component D5; the eleventh phase shifter C11 is linked with the twelfth phase shifter C12 through a sixth push component D6.

The reflecting plate of this solution is bent to form a first reflecting surface, a second reflecting surface, a third reflecting surface and a fourth reflecting surface. Each of the first reflecting surface, the second reflecting surface, the third reflecting surface and the fourth reflecting surface is equipped with eight oscillator units, so that four sectors can be formed in use. The directions of beams formed by different sectors are different. The oscillator units on each sector of this solution can be combined to form 4T4R, so as to meet the requirements for higher-frequency signal communication in the process of mobile communication. Moreover, this solution also includes the thirty-third oscillator unit to the fortieth oscillator unit B1 to B8, the thirty-third oscillator unit to the thirty-sixth oscillator unit B1 to B4 can be combined to form 4T4R, and the thirty-seventh oscillator unit to the fortieth oscillator unit B5 to B8 can also be combined to form 4T4R; this not only meets the requirements for low-frequency signal communication in the process of mobile communication, but also makes this solution meet the requirements for multi-frequency and multi-beam in use. In use, the oscillator units combined to form the same 4T4R are divided into two groups according to the mounting layout of the oscillator units; one group directly faces the first electromagnetic lens, and the other group directly faces the second electromagnetic lens; each group of oscillator units is connected with one phase shifter, and two phase shifters correspondingly connected to two groups of oscillator units combined to form the 4T4R are linked through a same push component. As such, beam downtilt angles of the two groups of oscillator units combined to form the 4T4R can be adjusted in use, so as to change a signal coverage area of each sector. In this solution, a signal of each oscillator unit is emitted in a form of plane-like wave after passing through the electromagnetic lens, which can improve the directionality of the beam. In this solution, adjusting the beam downtilt angle of the oscillator unit by controlling the phase shifter requires less motion space, which is conducive to reducing products' volume, and this way also makes the control on beam direction of the oscillator unit more accurate and more convenient to operate.

Further, the first push component D1, the second push component D2, the third push component D3, the fourth push component D4, the fifth push component D5 and the sixth push component D6 are all slidably mounted on the mounting plate; a sliding direction of each of the first push component D1, the second push component D2, the third push component D3, the fourth push component D4, the fifth push component D5 and the sixth push component D6 relative to the mounting plate is parallel to the central axis of the first electromagnetic lens; each of the first push component D1, the second push component D2, the third push component D3, the fourth push component D4, the fifth push component D5 and the sixth push component D6 is driven by a separate screw drive mechanism to slide relative to the mounting plate; each screw drive mechanism comprises a screw, a sliding block, a guide rod and a drive unit; both ends of the screw are rotationally mounted on the mounting plate, and a central axis of the screw is parallel to the central axis of the first electromagnetic lens; both ends of the guide rod are mounted on the mounting plate, and a central axis of the guide rod is parallel to the central axis of the screw; a screw hole and a guide hole are formed on the sliding block, the screw hole of the sliding block is connected to threads of the screw, and the guide hole of the sliding block is fitted with the guide rod; the drive unit is mounted on the mounting plate and used to drive the screw to rotate; each of the first push component D1, the second push component D2, the third push component D3, the fourth push component D4, the fifth push component D5 and the sixth push component D6 is connected with the a sliding block of its corresponding screw drive mechanism.

Further, a connecting rod is also mounted on the sliding block of the screw drive mechanism; the connecting rod is slidably mounted on the mounting plate, and a sliding direction of the connecting rod relative to the mounting plate is parallel to the central axis of the first electromagnetic lens; one end of each of the first to sixth push components D1 to D6 is connected to one end of the connecting rod of its corresponding screw drive mechanism through a connector, and the other end of the connecting rod is connected to a scale.

Further, the screw drive mechanism further comprises a limiting assembly, the limiting assembly comprises a sheathing component and a clamping component, the sheathing component is provided with a sheathing hole, a clamping ring groove is formed on an outer circumferential surface of the sheathing component, the sheathing component is further provided with a through hole connecting the clamping ring groove to the wall of the sheathing hole, and the sheathing component is sheathed on the screw through its sheathing hole; a plurality of pin holes are set on the screw, and the plurality of pin holes are arranged along the axis of the screw; the clamping component is a semi-enclosed ring-shaped component, a locating pin is formed on the inner surface of the clamping component, the clamping component is clamped in the clamping ring groove of the sheathing component, and a locating pin of the clamping component is inserted through the through hole of the sheathing component into the pin hole of the screw; a first blocking part is arranged on the screw, and the sliding block is positioned between the limiting assembly and the first blocking part; a second blocking part is formed on an end face of the sheathing component facing the sliding block, and a first pressing-against part cooperating with the first blocking part is formed on an end face of the sliding block facing the first blocking part, and a second pressing-against part cooperating with the second blocking part is formed on an end face of the sliding block facing the sheathing component.

Further, a cut surface is formed on the outer circumferential surface of the screw, and the pin hole is formed on the cut surface of the screw; the sheathing hole of the sheathing component is an irregularly-shaped hole with a plane, the through hole of the sheathing component penetrates the plane in the sheathing hole, and the plane in the sheathing hole of the sheathing component is wedged with the cut surface of the screw.

Further, the present application may also include a main control module, wherein the drive units of the screw drive mechanism for driving the first push component D1 to slide relative to the mounting plate, the screw drive mechanism for driving the second push component D2 to slide relative to the mounting plate, the screw drive mechanism for driving the third push component D3 to slide relative to the mounting plate, the screw drive mechanism for driving the fourth push component D4 to slide relative to the mounting plate, the screw drive mechanism for driving the fifth push component D5 to slide relative to the mounting plate, and the screw drive mechanism for driving the sixth push component D6 to slide relative to the mounting plate is electrically connected to the main control module; the main control module, the screw drive mechanism for driving the first push component D1 to slide relative to the mounting plate, the screw drive mechanism for driving the second push component D2 to slide relative to the mounting plate, the screw drive mechanism for driving the third push component D3 to slide relative to the mounting plate, the screw drive mechanism for driving the fourth push component D4 to slide relative to the mounting plate, the screw drive mechanism for driving the fifth push component D5 to slide relative to the mounting plate, and the screw drive mechanism for driving the sixth push component D6 to slide relative to the mounting plate constitute a module with a volume of 3000 $cm^3$ to 3200 $cm^3$.

Further, each of the first oscillator unit to the thirty-second oscillator unit A1 to A32 has an operating frequency of 1710 MHz to 2610 MHz, and each of the the thirty-third oscillator unit to the fortieth oscillator unit B1 to B8 has an operating frequency of 698 MHZ to 960 MHz.

Further, the first reflecting surface and the second reflecting surface form an angle F1 of 1300 to 150°, the second reflecting surface and the third reflecting surface form an angle F2 of 1300 to 150°, and the third reflecting surface and the fourth reflecting surface form an angle F3 of 1300 to 150°.

Further, the first straight line L1 and the second straight line L2 have a spacing K1 of 110±5 mm, the second straight line L2 and the third straight line L3 have a spacing K2 of 140±5 mm, the third straight line L3 and the fourth straight line L4 have a spacing K3 of 110±5 mm, and the first side L5 and the second side L6 have a spacing K4 of 290±5 mm.

Further, the mounting plate is bent to form a first mounting surface, a second mounting surface and a third mounting surface; each of the first mounting surface, the second mounting surface, and the third mounting surface is set to face the reflecting plate; the first mounting surface and the second mounting surface form an angle H1 of 1300 to 150°, and the second mounting surface and the third mounting surface form an angle H2 of 130° to 150°; the first, second, ninth and tenth phase shifters C1, C2, C9 and C10 are all mounted on the first mounting surface, the third, fourth, fifth and sixth phase shifters C3, C4, C5 and C6 are all mounted on the second mounting surface, and the seventh, eighth, eleventh and twelfth phase shifters C7, C8, C11 and C12 are all mounted on the third mounting surface.

Further, the first to twelfth phase shifters C1 to C12 are all PCB sliding sector phase shifters or metal cavity phase shifters.

Further, this solution may also include an outer shell; the outer shell includes a cylindrical component, a first end cover and a second end cover; the first end cover is covered and fixed on one opening of the cylindrical component, and the second end cover is covered and fixed on the other opening of the cylindrical component, so that the first end cover, the cylindrical component and the second end cover constitute a chamber; the first electromagnetic lens, the second electromagnetic lens, the mounting plate, the reflecting plate, the first to thirty-second oscillator units A1 to A32, the thirty-third to fortieth oscillator units B1 to B8, the first to twelfth phase shifters C1 to C12, and the screw drive mechanism are all mounted in the chamber; and the scale on the screw drive mechanism extends out of the chamber through the first end cover.

Further, a first pull component G1 and a second pull component G2 are fixed on the first push component D1, a third pull component G3 and a fourth pull component G4 are fixed on the second push component D2, a fifth pull component G5 and a sixth pull component G6 are fixed on the third push component D3, a seventh pull component G7 and a eighth pull component G8 are fixed on the fourth push component D4, a ninth pull component G9 and a tenth pull component G10 are fixed on the fifth push component D5, and a eleventh pull component G11 and a twelfth pull component G12 are fixed on the sixth push component D6; each of the first to twelfth pull components G1 to G12 is provided with an elongated hole; the elongated hole on the first pull component G1 is nested with the cylinder on the sliding block of the first phase shifter C1; the elongated hole on the second pull component G2 is nested with the cylinder on the sliding block of the second phase shifter C2; the elongated hole on the third pull component G3 is nested with the cylinder on the sliding block of the third phase shifter C3; the elongated hole on the fourth pull component G4 is nested with the cylinder on the sliding block of the fourth phase shifter C4; the elongated hole on the fifth pull component G5 is nested with the cylinder on the sliding block of the fifth phase shifter C5; the elongated hole on the sixth pull component G6 is nested with the cylinder on the sliding block of the sixth phase shifter C6; the elongated hole on the seventh pull component G7 is nested with the cylinder on the sliding block of the seventh phase shifter C7; the elongated hole on the eighth pull component G8 is nested with the cylinder on the sliding block of the eighth phase shifter C8; the elongated hole on the ninth pull component G9 is nested with the cylinder on the sliding block of the ninth phase shifter C9; the elongated hole on the tenth pull component G10 is nested with the cylinder on the sliding block of the tenth phase shifter C10; the elongated hole on the eleventh pull component G11 is nested with the cylinder on the sliding block of the eleventh phase shifter C11; and the elongated hole on the twelfth pull component G12 is nested with the cylinder on the sliding block of the twelfth phase shifter C12.

The application has advantages of simple structure, scientific design, small size, flexible setting of beam direction, and being able to meet the requirements of an MIMO technology for the number of channels.

DETAILED DESCRIPTION OF THE EMBODIMENTS

Embodiment 1

Figure 1:
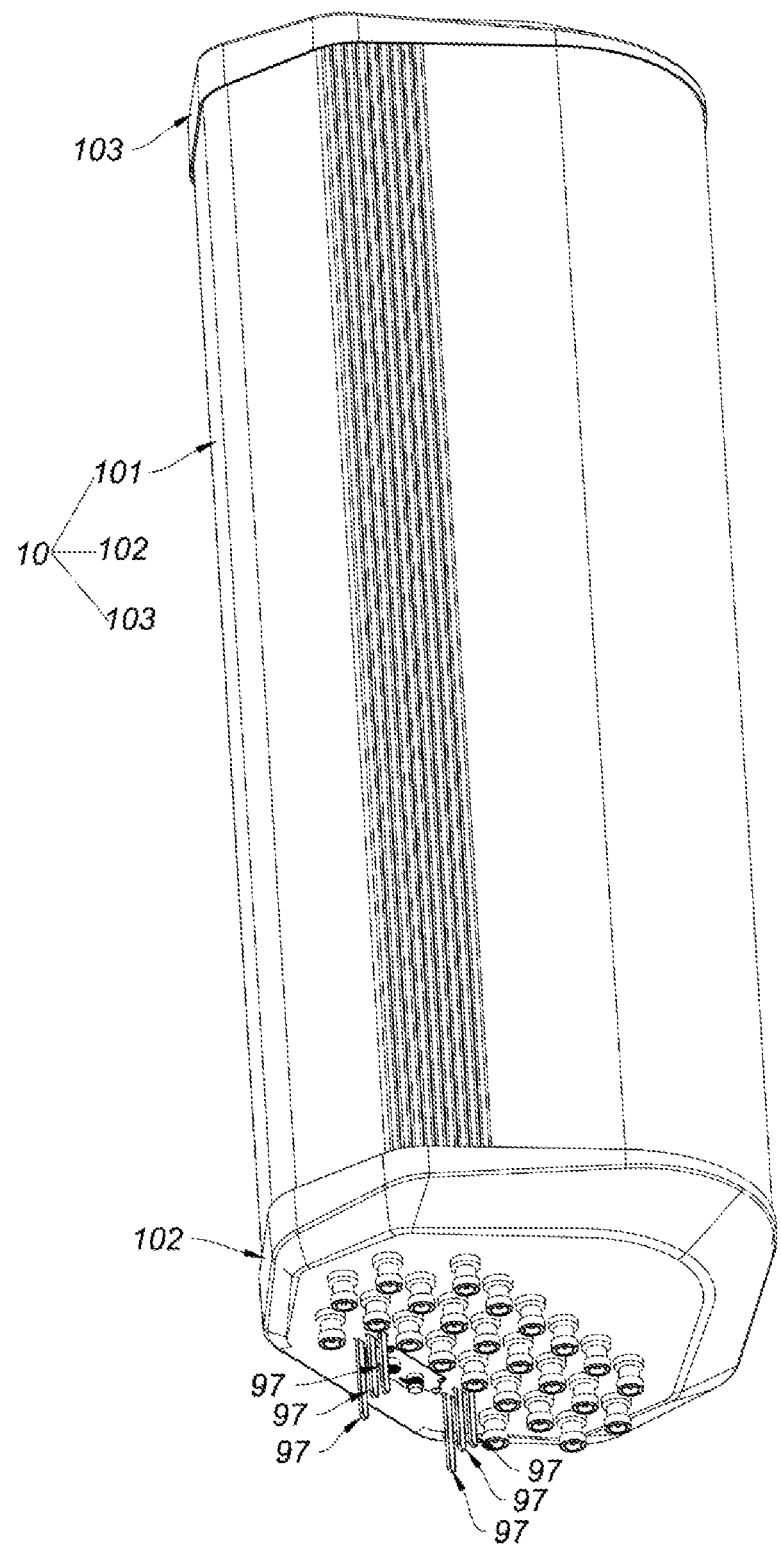
FIG. 1 is a structure diagram of embodiment 1.
Figure 2:
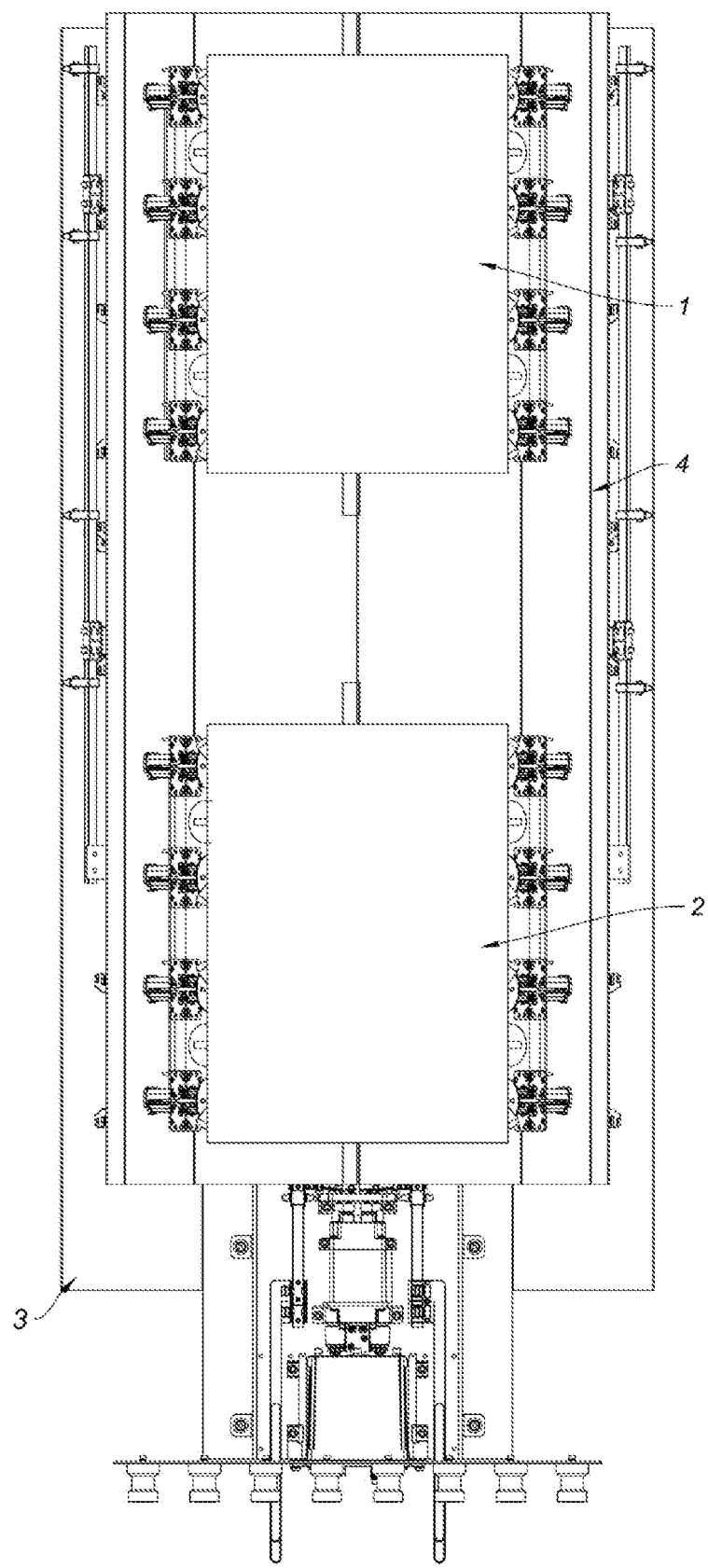
FIG. 2 is a front structure diagram of embodiment 1 with the outer shell removed.

As shown in FIG. 1, FIG. 2, FIG. 3, FIG. 4, FIG. 5, and FIG. 6, a multi-frequency and multi-beam independent electrically adjustable antenna of this embodiment includes a first electromagnetic lens 1, a second electromagnetic lens 2, a mounting plate 3, a reflecting plate 4, a first oscillator unit A1 51, a second oscillator unit A2 52, a third oscillator unit A3 53, a fourth oscillator unit A4 54, a fifth oscillator unit A5 55, a sixth oscillator unit A6 56, a seventh oscillator unit A7 57, an eighth oscillator unit A8 58, a ninth oscillator unit A9 59, a tenth oscillator unit A10 510, an eleventh oscillator unit A11 511, a twelfth oscillator unit A12 512, a thirteenth oscillator unit A13 513, a fourteenth oscillator unit A14 514, a fifteenth oscillator unit A15 515, a sixteenth oscillator unit A16 516, a seventeenth oscillator unit A17 517, an eighteenth oscillator unit A18 518, a nineteenth oscillator unit A19 519, a twentieth oscillator unit A20 520, a twenty-first oscillator unit A21 521, a twenty-second oscillator unit A22 522, a twenty-third oscillator unit A23 523, a twenty-fourth oscillator unit A24 524, a twenty-fifth oscillator unit A25 525, a twenty-sixth oscillator unit A26 526, a twenty-seventh oscillator unit A27 527, a twenty-eighth oscillator unit A28 528, a twenty-ninth oscillator unit A29 529, a thirtieth oscillator unit A30 530, a thirty-first oscillator unit A31 531, a thirty-second oscillator unit A32 532, a thirty-third oscillator unit B1 61, a thirty-fourth oscillator unit B2 62, a thirty-fifth oscillator unit B3 63, a thirty-sixth oscillator unit B4 64, a thirty-seventh oscillator unit B5 65, a thirty-eighth oscillator unit B6 66, a thirty-ninth oscillator unit B7 67, an fortieth oscillator unit B8 68, a first phase shifter C1 71, a second phase shifter C2 72, a third phase shifter C3 73, a fourth phase shifter C4 74, a fifth phase shifter C5 75, a sixth phase shifter C6 76, a seventh phase shifter C7 77, an eighth phase shifter C8 78, a ninth phase shifter C9 79, a tenth phase shifter C10 710, a eleventh phase shifter C11 711, and a twelfth phase shifter C12 712.

The reflecting plate 4 is bent to form a first reflecting surface 41, a second reflecting surface 42, a third reflecting surface 43 and a fourth reflecting surface 44. The first reflecting surface 41, the second reflecting surface 42, the third reflecting surface 43 and the fourth reflecting surface 44 are successively connected to form a wrap angle.

Both the first electromagnetic lens 1 and the second electromagnetic lens 2 are cylindrical lenses. The first electromagnetic lens 1 and the second electromagnetic lens 2 are both partially positioned in the wrap angle. A central axis of the first electromagnetic lens 1 is collinear with a central axis of the second electromagnetic lens 2.

The first electromagnetic lens 1, the second electromagnetic lens 2, the reflecting plate 4 and the mounting plate 3 are fixed relative to each other, and the mounting plate 3 is on a side of the reflecting plate 4 facing away from the first electromagnetic lens 1 and the second electromagnetic lens 2.

The first oscillator unit A 51, the second oscillator unit A2 52, the third oscillator unit A3 53, the fourth oscillator unit A4 54, the fifth oscillator unit A5 55, the sixth oscillator unit A6 56, the seventh oscillator unit A7 57, the eighth oscillator unit A8 58, the ninth oscillator unit A9 59, the tenth oscillator unit A10 510, the eleventh oscillator unit A11 511, the twelfth oscillator unit A12 512, the thirteenth oscillator unit A13 513, the fourteenth oscillator unit A14 514, the fifteenth oscillator unit A15 515, the sixteenth oscillator unit A16 516, the seventeenth oscillator unit A17 517, the eighteenth oscillator unit A18 518, the nineteenth oscillator unit A19 519, the twentieth oscillator unit A20 520, the twenty-first oscillator unit A21 521, the twenty-second oscillator unit A22 522, the twenty-third oscillator unit A23 523, the twenty-fourth oscillator unit A24 524, the twenty-fifth oscillator unit A25 525, the twenty-sixth oscillator unit A26 526, the twenty-seventh oscillator unit A27 527, the twenty-eighth oscillator unit A28 528, the twenty-ninth oscillator unit A29 529, the thirtieth oscillator unit A30 530, the thirty-first oscillator unit A31 531 and the thirty-second oscillator unit A32 532 are oscillators with a same operating frequency. The thirty-third oscillator unit B1 61, the thirty-fourth oscillator unit B2 62, the thirty-fifth oscillator unit B3 63, the thirty-sixth oscillator unit B4 64, the thirty-seventh oscillator unit B5 65, the thirty-eighth oscillator unit B6 66, the thirty-ninth oscillator unit B7 67 and the fortieth oscillator unit B8 68 are oscillators with a same operating frequency. Each of the oscillator units A1 to A32 has an operating frequency of 1710 MHz to 2610 MHz, and each of the thirty-third to fortieth oscillator units B1 to B8 has an operating frequency of 698 MHZ to 960 MHz.

The first oscillator unit A15 1, the second oscillator unit A2 52, the third oscillator unit A3 53, the fourth oscillator unit A4 54, the fifth oscillator unit A5 55, the sixth oscillator unit A6 56, the seventh oscillator unit A7 57 and the eighth oscillator unit A8 58 are all mounted on the first reflecting surface 41. The first oscillator unit A1 51, the second oscillator unit A2 52, the third oscillator unit A3 53, the fourth oscillator unit A4 54, the fifth oscillator unit A5 55, the sixth oscillator unit A6 56, the seventh oscillator unit A7 57 and the eighth oscillator unit A8 58 are arranged in sequence along a first straight line L1. Each of the first oscillator unit A1 51, the second oscillator unit A2 52, the third oscillator unit A3 53 and the fourth oscillator unit A4 54 is set to have a signal receiving and transmitting direction towards the first electromagnetic lens 1 and perpendicular to the central axis of the first electromagnetic lens 1. Each of the fifth oscillator unit A5 55, the sixth oscillator unit A6 56, the seventh oscillator unit A7 57 and the eighth oscillator unit A8 58 is set to have a signal receiving and transmitting direction towards the second electromagnetic lens 2 and perpendicular to the central axis of the second electromagnetic lens 2.

The ninth oscillator unit A9 59, the tenth oscillator unit A10 510, the eleventh oscillator unit A11 511, the twelfth oscillator unit A12 512, the thirteenth oscillator unit A13 513, the fourteenth oscillator unit A14 514, the fifteenth oscillator unit A15 515 and the sixteenth oscillator unit A16 516 are all mounted on the second reflecting surface 42. The ninth oscillator unit A9 59, the tenth oscillator unit A10 510, the eleventh oscillator unit A11 511, the twelfth oscillator unit A12 512, the thirteenth oscillator unit A13 513, the fourteenth oscillator unit A14 514, the fifteenth oscillator unit A15 515 and the sixteenth oscillator unit A16 516 are arranged in sequence along a second straight line L2. Each of the ninth oscillator unit A9 59, the tenth oscillator unit A10 510, the eleventh oscillator unit A11 511 and the twelfth oscillator unit A12 512 is set to have a signal receiving and transmitting direction towards the first electromagnetic lens 1 and perpendicular to the central axis of the first electromagnetic lens 1. Each of the thirteenth oscillator unit A13 513, the fourteenth oscillator unit A14 514, the fifteenth oscillator unit A15 515 and the sixteenth oscillator unit A16 516 is set to have a signal receiving and transmitting direction towards the second electromagnetic lens 2 and perpendicular to the central axis of the second electromagnetic lens 2.

The seventeenth oscillator unit A17 517, the eighteenth oscillator unit A18 518, the nineteenth oscillator unit A19 519, the twentieth oscillator unit A20 520, the twenty-first oscillator unit A21 521, the twenty-second oscillator unit A22 522, the twenty-third oscillator unit A23 523 and the twenty-fourth oscillator unit A24 524 are all mounted on the third reflecting surface 43. The seventeenth oscillator unit A17 517, the eighteenth oscillator unit A18 518, the nineteenth oscillator unit A19 519, the twentieth oscillator unit A20 520, the twenty-first oscillator unit A21 521, the twenty-second oscillator unit A22 522, the twenty-third oscillator unit A23 523 and the twenty-fourth oscillator unit A24 524 are arranged in sequence along a third straight line L3. Each of seventeenth the oscillator unit A17 517, the eighteenth oscillator unit A18 518, the nineteenth oscillator unit A19 519 and the twentieth oscillator unit A20 520 is set to have a signal receiving and transmitting direction towards the first electromagnetic lens 1 and perpendicular to the central axis of the first electromagnetic lens 1. Each of the twenty-first oscillator unit A21 521, the twenty-second oscillator unit A22 522, the twenty-third oscillator unit A23 523 and the twenty-fourth oscillator unit A24 524 is set to have a signal receiving and transmitting direction towards the second electromagnetic lens 2 and perpendicular to the central axis of the second electromagnetic lens 2.

The twenty-fifth oscillator unit A25 525, the twenty-sixth oscillator unit A26 526, the twenty-seventh oscillator unit A27 527, the twenty-eighth oscillator unit A28 528, the twenty-ninth oscillator unit A29 529, the thirtieth oscillator unit A30 530, the thirty-first oscillator unit A31 531 and the thirty-second oscillator unit A32 532 are all mounted on the fourth reflecting surface 44. The twenty-fifth oscillator unit A25 525, the twenty-sixth oscillator unit A26 526, the twenty-seventh oscillator unit A27 527, the twenty-eighth oscillator unit A28 528, the twenty-ninth oscillator unit A29 529, the thirtieth oscillator unit A30 530, the thirty-first oscillator unit A31 531 and the thirty-second oscillator unit A32 532 are arranged in sequence along a fourth straight line L4. Each of the twenty-fifth oscillator unit A25 525, the twenty-sixth oscillator unit A26 526, the twenty-seventh oscillator unit A27 527 and the twenty-eighth oscillator unit A28 528 is set to have a signal receiving and transmitting direction towards the first electromagnetic lens 1 and perpendicular to the central axis of the first electromagnetic lens 1. Each of the twenty-ninth oscillator unit A29 529, the thirtieth oscillator unit A30 530, the thirty-first oscillator unit A31 531 and the thirty-second oscillator unit A32 532 is set to have a signal receiving and transmitting direction towards the second electromagnetic lens 2 and perpendicular to the central axis of the second electromagnetic lens 2.

The thirty-third oscillator unit B1 61, the thirty-fourth oscillator unit B2 62, the thirty-fifth oscillator unit B3 63 and the thirty-sixth oscillator unit B4 64 are all mounted on the reflecting plate 4. The thirty-third oscillator unit B1 61, the thirty-fourth oscillator unit B2 62, the thirty-fifth oscillator unit B3 63 and the thirty-sixth oscillator unit B4 64 are arranged in sequence along a first side L5 formed by connecting the first reflecting surface 41 and the second reflecting surface 42. Each of the thirty-third oscillator unit B1 61 and the thirty-fourth oscillator unit B2 62 is set to have a signal receiving and transmitting direction towards the first electromagnetic lens 1 and perpendicular to the central axis of the first electromagnetic lens 1. Each of the thirty-fifth oscillator unit B3 63 and the thirty-sixth oscillator unit B4 64 is set to have a signal receiving and transmitting direction towards the second electromagnetic lens 2 and perpendicular to the central axis of the second electromagnetic lens 2.

The thirty-seventh oscillator unit B5 65, the thirty-eighth oscillator unit B6 66, the thirty-ninth oscillator unit B7 67 and the fortieth oscillator unit B8 68 are all mounted on the reflecting plate 4. The thirty-seventh oscillator unit B5 65, the thirty-eighth oscillator unit B6 66, the thirty-ninth oscillator unit B7 67 and the fortieth oscillator unit B8 68 are arranged in sequence along a second side L6 formed by connecting the third reflecting surface 43 and the fourth reflecting surface 44. The straight lines L1, L2, L3, and L4 and the first and second sides L5 and L6 are all parallel to the central axis of the first electromagnetic lens. The first straight line L1 and the second straight line L2 have a spacing K1 of 110 mm; the second straight line L2 and the third straight line L3 have a spacing K2 of 140 mm; the third straight line L3 and the fourth straight line L4 have a spacing K3 of 110 mm; and the first side L5 and the second side L6 have a spacing K4 of 290 mm. Each of the thirty-seventh oscillator unit B5 65 and the thirty-eighth oscillator unit B6 66 is set to have a signal receiving and transmitting direction towards the first electromagnetic lens 1 and perpendicular to the central axis of the first electromagnetic lens 1. Each of the thirty-ninth oscillator unit B7 67 and the fortieth oscillator unit B8 68 is set to have a signal receiving and transmitting direction towards the second electromagnetic lens 2 and perpendicular to the central axis of the second electromagnetic lens 2.

The first phase shifter C1 71, the second phase shifter C2 72, the third phase shifter C3 73, the fourth phase shifter C4 74, the fifth phase shifter C5 75, the sixth phase shifter C6 76, the seventh phase shifter C7 77, the eighth phase shifter C8 78, the ninth phase shifter C9 79, the tenth phase shifter C10 710, the eleventh phase shifter C11 711, and the twelfth phase shifter C12 712 are all mounted on the mounting plate 3. The first phase shifter C1 71, the second phase shifter C2 72, the third phase shifter C3 73, the fourth phase shifter C4 74, the fifth phase shifter C5 75, the sixth phase shifter C6 76, the seventh phase shifter C7 77, the eighth phase shifter C8 78, the ninth phase shifter C9 79, the tenth phase shifter C10 710, the eleventh phase shifter C11 711, and the twelfth phase shifter C12 712 are all PCB sliding sector phase shifters. The first oscillator unit A1 51, the second oscillator unit A2 52, the third oscillator unit A3 53 and the fourth oscillator unit A4 54 are all electrically connected to an output end of the first phase shifter C1 71 to form 2T2R, and the fifth oscillator unit A5 55, the sixth oscillator unit A6 56, the seventh oscillator unit A7 57 and the eighth oscillator unit A8 58 are all electrically connected to an output end of the second phase shifter C2 72 to form 2T2R, so that the first oscillator unit A1 S1, the second oscillator unit A2 52, the third oscillator unit A3 53, the fourth oscillator unit A4 54, the fifth oscillator unit A5 55, the sixth oscillator unit A6 56, the seventh oscillator unit A7 57 and the eighth oscillator unit A8 58 form 4T4R. The ninth oscillator unit A9 59, the tenth oscillator unit A10 510, the eleventh oscillator unit A11 511 and the twelfth oscillator unit A12 512 are all electrically connected to an output end of the third phase shifter C3 73 to form 2T2R, and the thirteenth oscillator unit A13 513, the fourteenth oscillator unit A14 514, the fifteenth oscillator unit A15 515 and the sixteenth oscillator unit A16 516 are all electrically connected to an output end of the fourth phase shifter C4 74 to form 2T2R, so that the ninth oscillator unit A9 59, the tenth oscillator unit A10 510, the eleventh oscillator unit A11 511, the twelfth oscillator unit A12 512, the thirteenth oscillator unit A13 513, the fourteenth oscillator unit A14 514, the fifteenth oscillator unit A15 515 and the sixteenth oscillator unit A16 516 form 4T4R. The seventeenth oscillator unit A17 517, the eighteenth oscillator unit A18 518, the nineteenth oscillator unit A19 519 and the twentieth oscillator unit A20 520 are all electrically connected to an output end of the fifth phase shifter C5 75 to form 2T2R, and the twenty-first oscillator unit A21 521, the twenty-second oscillator unit A22 522, the twenty-third oscillator unit A23 523 and the twenty-fourth oscillator unit A24 524 are all electrically connected to an output end of the sixth phase shifter C6 76 to form 2T2R, so that the seventeenth oscillator unit A17 517, the eighteenth oscillator unit A18 518, the nineteenth oscillator unit A19 519, the twentieth oscillator unit A20 520, the twenty-first oscillator unit A21 521, the twenty-second oscillator unit A22 522, the twenty-third oscillator unit A23 523, the twenty-fourth oscillator unit A24 524 form 4T4R. The twenty-fifth oscillator unit A25 525, the twenty-sixth oscillator unit A26 526, the twenty-seventh oscillator unit A27 527, the twenty-eighth oscillator unit A28 528 are all electrically connected to an output end of the seventh phase shifter C7 77 to form 2T2R, and the twenty-ninth oscillator unit A29 529, the thirtieth oscillator unit A30 530, the thirty-first oscillator unit A31 531 and the thirty-second oscillator unit A32 532 are all electrically connected to an output end of the eighth phase shifter C8 78 to form 2T2R, so that the twenty-fifth oscillator unit A25 525, the twenty-sixth oscillator unit A26 526, the twenty-seventh oscillator unit A27 527, the twenty-eighth oscillator unit A28 528, the twenty-ninth oscillator unit A29 529, the thirtieth oscillator unit A30 530, the thirty-first oscillator unit A31 531 and the thirty-second oscillator unit A32 532 form 4T4R. The thirty-third oscillator unit B1 61 and the thirty-fourth oscillator unit B2 62 are both electrically connected to an output end of the ninth phase shifter C9 79 to form 2T2R, the thirty-fifth oscillator unit B3 63 and the thirty-sixth oscillator unit B4 64 are both electrically connected to an output end of the tenth phase shifter C10 710 to form 2T2R, so that the thirty-third oscillator unit B1 61, the thirty-fourth oscillator unit B2 62, the thirty-fifth oscillator unit B3 63 and the thirty-sixth oscillator unit B4 64 form 4T4R. The thirty-seventh oscillator unit B5 65 and the thirty-eighth oscillator unit B6 66 are both electrically connected to an output end of the eleventh phase shifter C11 711 to form 2T2R, the thirty-ninth oscillator unit B7 67 and the fortieth oscillator unit B8 68 are both electrically connected to an output end of the twelfth phase shifter C12 712 to form 2T2R, so that the thirty-seventh oscillator unit B5 65, the thirty-eighth oscillator unit B6 66, the thirty-ninth oscillator unit B7 67 and the fortieth oscillator unit B8 68 form 4T4R.

The first phase shifter C1 71 is linked with the second phase shifter C2 72 through a first push component D1 81. The third phase shifter C3 73 is linked with the fourth phase shifter C4 74 through a second push component D2 82. The fifth phase shifter C5 75 is linked with the sixth phase shifter C6 76 through a third push component D3 83. The seventh phase shifter C7 77 is linked with the eighth phase shifter C8 78 through a fourth push component D4 84. The ninth phase shifter C9 79 is linked with the tenth phase shifter C10 710 through a fifth push component D5 85. The eleventh phase shifter C11 711 is linked with the twelfth phase shifter C12 712 through a sixth push component D6 86.

In order to make a drive structure of the first push component D1 81, the second push component D2 82, the third push component D3 83, the fourth push component D4 84, the fifth push component D5 85 and the sixth push component D6 86 more reasonable, as shown in FIG. 5, FIG. 6, FIG. 7 and FIG. 8, the first push component D1 81, the second push component D2 82, the third push component D3 83, the fourth push component D4 84, the fifth push component D5 85 and the sixth push component D6 86 are all slidably mounted on the mounting plate 3. A sliding direction of each of the first push component D1 81, the second push component D2 82, the third push component D3 83, the fourth push component D4 84, the fifth push component D5 85 and the sixth push component D6 86 relative to the mounting plate 3 is parallel to the central axis of the first electromagnetic lens 1. Each of the first push component D1 81, the second push component D2 82, the third push component D3 83, the fourth push component D4 84, the fifth push component D5 85 and the sixth push component D6 86 is driven by a separate screw drive mechanism 9 to slide relative to the mounting plate 3. Each screw drive mechanism 9 includes a screw 91, a sliding block 92, a guide rod 93 and a drive unit 94. Both ends of the screw 91 are rotationally mounted on the mounting plate 3, and a central axis of the screw 91 is parallel to the central axis of the first electromagnetic lens 1. Both ends of the guide rod 93 are mounted on the mounting plate 3, and a central axis of the guide rod 93 is parallel to the central axis of the screw 91. A screw hole 921 and a guide hole 922 are formed on the sliding block 92, the screw hole 921 of the sliding block 92 is connected to threads of the screw 91, and the guide hole 922 of the sliding block 92 is fitted with the guide rod 93. The drive unit 94 is mounted on the mounting plate 3 and used to drive the screw 91 to rotate. Each of the first push component D1 81, the second push component D2 82, the third push component D3 83, the fourth push component D4 84, the fifth push component D5 85 and the sixth push component D6 86 is connected with a sliding block 92 of its corresponding screw drive mechanism 9.

Two ends of the screw 91 of the screw drive mechanism 9 are respectively mounted on a rotating mounting base 30 rotationally. The rotating mounting base 30 is fixed on the mounting plate 3. The screws of the screw drive mechanism for driving the first push component D1 81 to slide relative to the mounting plate 3, the screw drive mechanism for driving the second push component D2 82 to slide relative to the mounting plate 3, the screw drive mechanism for driving the third push component D3 83 to slide relative to the mounting plate 3, the screw drive mechanism for driving the fourth push component D4 84 to slide relative to the mounting plate 3, the screw drive mechanism for driving the fifth push component D5 85 to slide relative to the mounting plate 3, and the screw drive mechanism for driving the sixth push component D6 86 to slide relative to the mounting plate 3 can share two rotating mounting bases 30. Two ends of each of the guide rods 93 of the screw drive mechanism for driving the first push component D1 81 to slide relative to the mounting plate 3, the screw drive mechanism for driving the second push component D2 82 to slide relative to the mounting plate 3, the screw drive mechanism for driving the third push component D3 83 to slide relative to the mounting plate 3, the screw drive mechanism for driving the fourth push component D4 84 to slide relative to the mounting plate 3, the screw drive mechanism for driving the fifth push component D5 85 to slide relative to the mounting plate 3, and the screw drive mechanism for driving the sixth push component D6 86 to slide relative to the mounting plate 3 are also correspondingly mounted on the two rotating mounting bases 30. Each of the first push component D1 81, the second push component D2 82, the third push component D3 83, the fourth push component D4 84, the fifth push component D5 85 and the sixth push component D6 86 is slidably mounted on the mounting plate 3 through four sliding mounting bases 20. A phase shifter is arranged between every two sliding mounting bases 20, so that a sliding sheet of the phase shifter can slide more smoothly when it is pushed. The first push component D1 81, the second push component D2 82, the third push component D3 83, the fourth push component D4 84, the fifth push component D5 85 and the sixth push component D6 86 are all rods, and a sliding hole for the rod to pass through is formed on the sliding mounting base 20. Drive units of the screw drive mechanism for driving the first push component D1 81 to slide relative to the mounting plate 3, the screw drive mechanism for driving the second push component D2 82 to slide relative to the mounting plate 3, the screw drive mechanism for driving the third push component D3 83 to slide relative to the mounting plate 3, the screw drive mechanism for driving the fourth push component D4 84 to slide relative to the mounting plate 3, the screw drive mechanism for driving the fifth push component D5 85 to slide relative to the mounting plate 3, and the screw drive mechanism for driving the sixth push component D6 86 to slide relative to the mounting plate 3 are integrated in a box.

Figure 5:
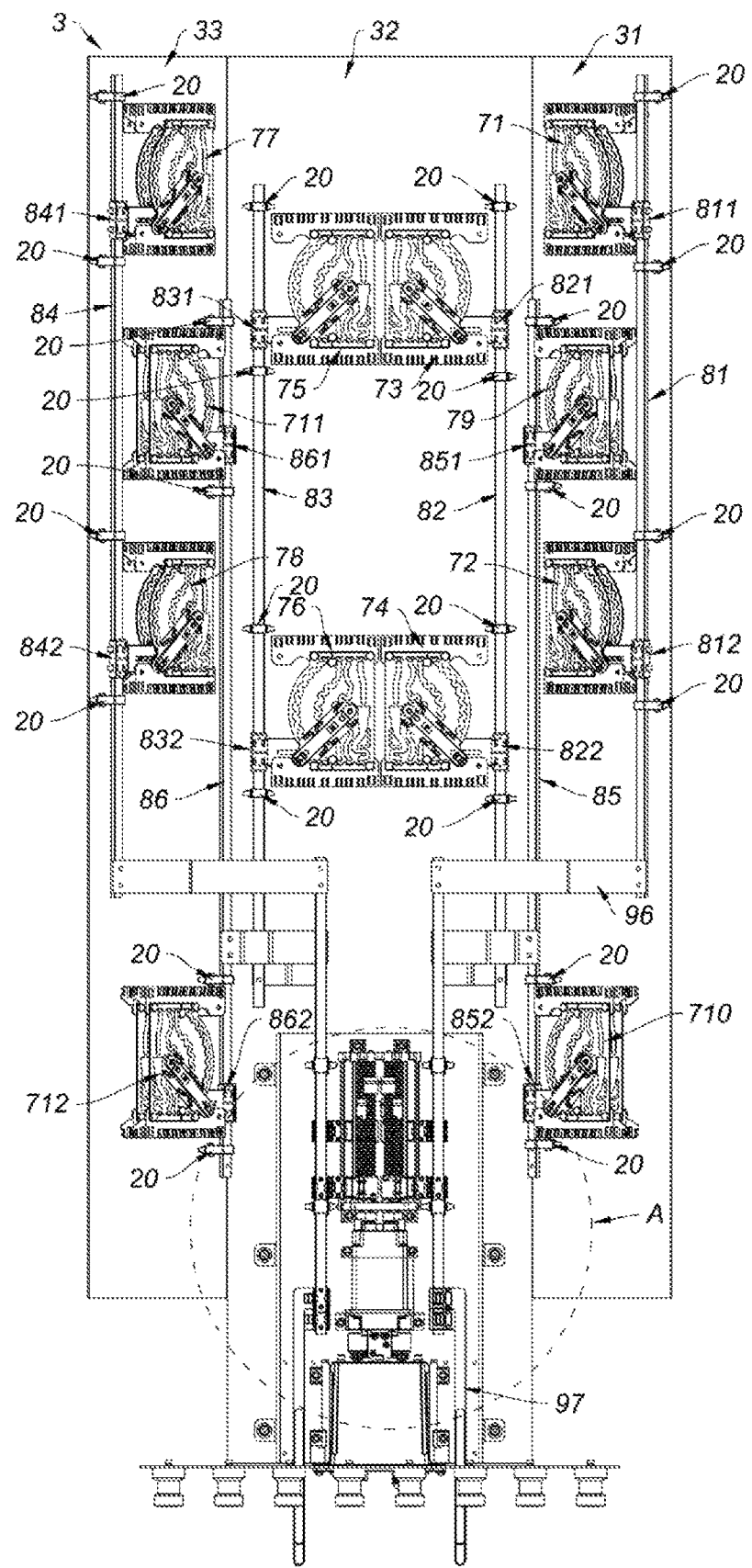
FIG. 5 is a front structure diagram of embodiment 1 with the outer shell, the first electromagnetic lens, the second electromagnetic lens, the oscillator units and the reflecting plate removed.
Figure 6:
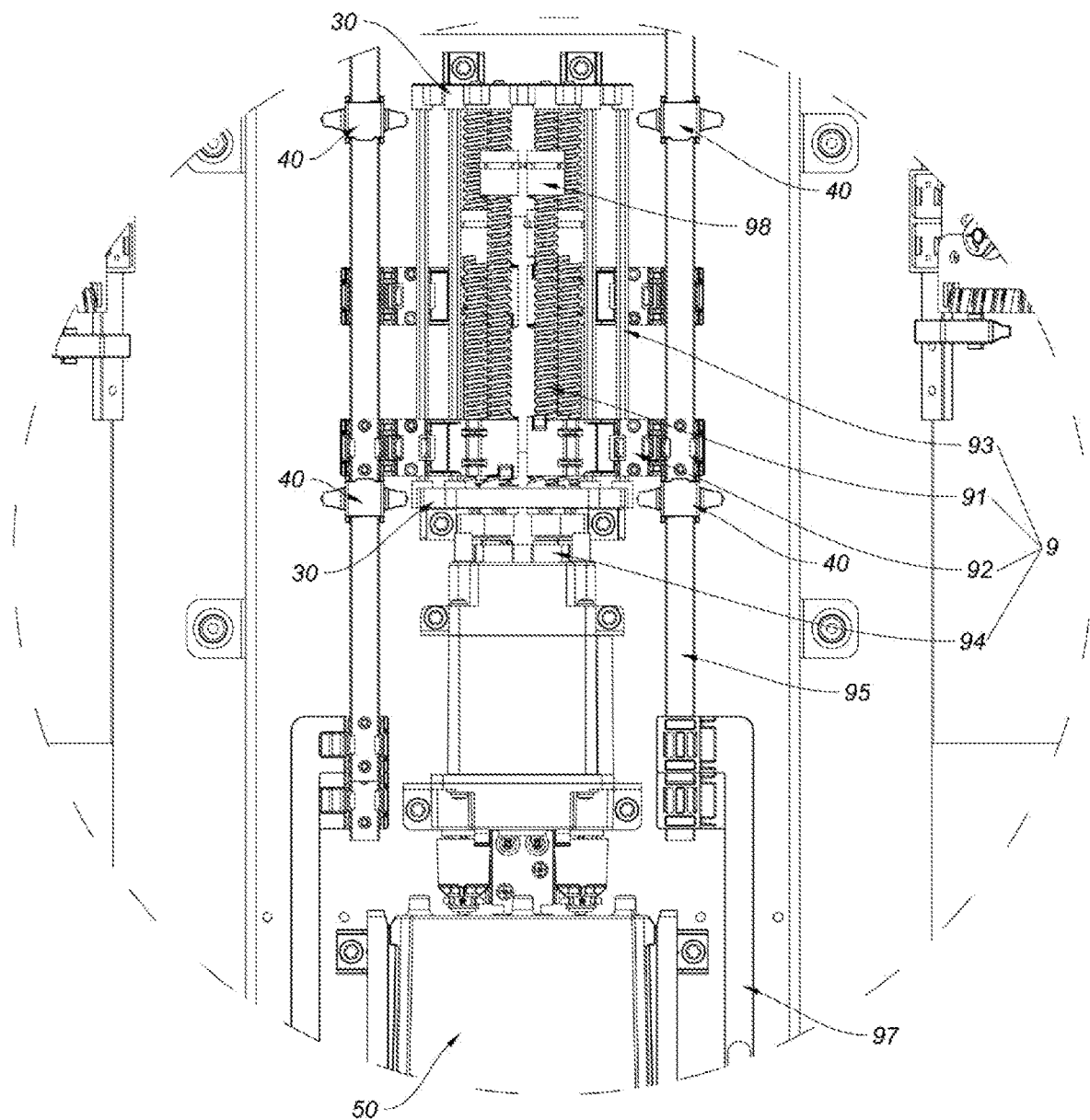
FIG. 6 is an enlarged structure diagram of part A in FIG. 5.

In order to make the structure of the screw drive mechanism 9 more reasonable, as shown in FIG. 5, a connecting rod 95 is also mounted on the sliding block 92 of the screw drive mechanism 9. The connecting rod 95 is slidably mounted on the mounting plate 3. A sliding direction of the connecting rod 95 relative to the mounting plate 3 is parallel to the central axis of the first electromagnetic lens 1. One end of each of the push components D1 81 to D6 86 is connected to one end of the connecting rod 95 of its corresponding screw drive mechanism 9 through a connector 96, and the other end of the connecting rod 95 is connected to a scale 97. The adjustment ranges of the first phase shifter C1 71, the second phase shifter C2 72, the third phase shifter C3 73, the fourth phase shifter C4 74, the fifth phase shifter C5 75, the sixth phase shifter C6 76, the seventh phase shifter C7 77, the eighth phase shifter C8 78, the ninth phase shifter C9 79, the tenth phase shifter C10 710, the eleventh phase shifter C11 711 and the twelfth phase shifter C12 712 can be determined by observing the scale 97 in use. The connecting rod 95 of each screw drive mechanism 9 is mounted on the mounting plate 3 through two sliding mounting components 40. A through hole for the connecting rod 95 to pass through is formed on the sliding mounting component 40. The sliding block 92 of the screw drive mechanism 9 is between two sliding mounting components 40, so that the sliding block 92 slides more smoothly.

As shown in FIG. 5, FIG. 6, FIG. 7 and FIG. 8, the screw drive mechanism 9 further includes a limiting assembly 98 to limit the maximum motion amplitude of the sliding block 92 on the screw 91, so that the swing amplitude of the sliding sheet 71 on each of the phase shifter C1, the second phase shifter C2 72, the third phase shifter C3 73, the fourth phase shifter C4 74, the fifth phase shifter C5 75, the sixth phase shifter C6 76, the seventh phase shifter C7 77, the eighth phase shifter C8 78, the ninth phase shifter C9 79, the tenth phase shifter C10 710, the eleventh phase shifter C11 711 and the twelfth phase shifter C12 712 is limited. The limiting assembly 98 includes a sheathing component 981 and a clamping component 982. The sheathing component 981 is provided with a sheathing hole 9811. A clamping ring groove 9812 is formed on an outer circumferential surface of the sheathing component 981. The sheathing component 981 is further provided with a through hole 9813 connecting the clamping ring groove 9812 to the wall of the sheathing hole 9811, and the sheathing component 981 is sheathed on the screw 91 through its sheathing hole 9811. A plurality of pin holes 911 are set on the screw 91, and the plurality of pin holes 911 are arranged along the axis of the screw 91. The clamping component 982 is a semi-enclosed ring-shaped component. A locating pin 9821 is formed on the inner surface of the clamping component 982. The clamping component 982 is clamped in the clamping ring groove 9812 of the sheathing component 981, and the locating pin 9821 of the clamping component 982 is inserted through the through hole 9813 of the sheathing component 981 into the pin hole 911 of the screw 91. A first blocking part 912 is arranged on the screw 91, and the sliding block 92 is positioned between the limiting assembly 98 and the first blocking part 912. A second blocking part 9814 is formed on an end face of the sheathing component 981 facing the sliding block 92. A first pressing-against part 923 cooperating with the first blocking part 912 is formed on an end face of the sliding block 92 facing the first blocking part 912, and a second pressing-against part 924 cooperating with the second blocking part 9814 is formed on an end face of the sliding block 92 facing the sheathing component 981. In use, the screw 91 is positively rotated to move the sliding block 92 on the screw 91 closer to the limiting assembly 98, until the second pressing-against part 924 of the sliding block 92 presses against the second blocking part 9814 on the sheathing component 981 and the sliding block 92 stops moving, which can prevent the screw 91 from continuing to rotate to cause the sliding block 92 to lock the screw 91 cooperating with the sheathing component 981. As such, the screw 91 can be prevented from being damaged by excessive torque at the moment when the screw 91 is reversely rotated to move the sliding block 92 farther away from the sheathing component 981. Correspondingly, the screw 91 can be reversely rotated to move the sliding block 92 on the screw 9 closer to the first blocking part 912, until the first pressing-against part 923 of the sliding block 92 presses against the first blocking part 912 and the sliding block 92 stops moving, which allows the sliding block 92 not to separate from the screw 91.

Figure 7:
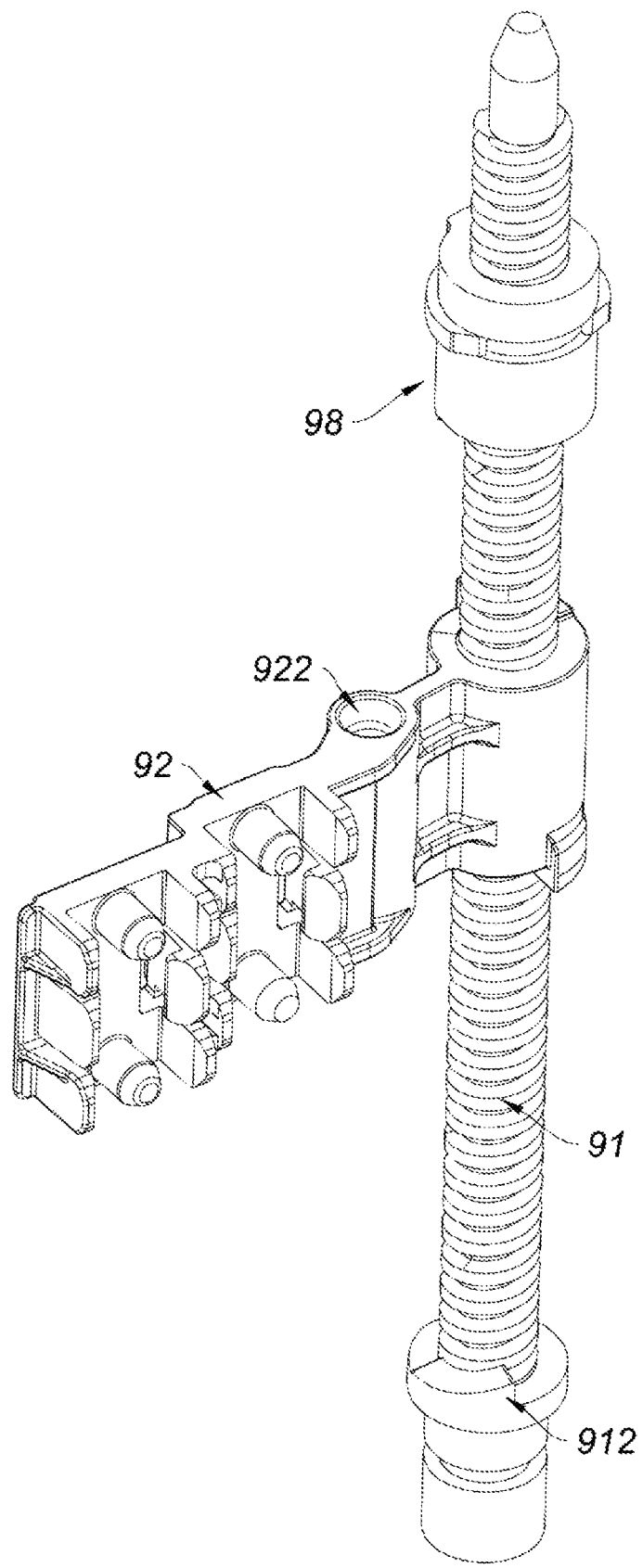
FIG. 7 is a structure diagram of embodiment 1 with a sliding block and a limiting assembly mounted on a screw.
Figure 8:
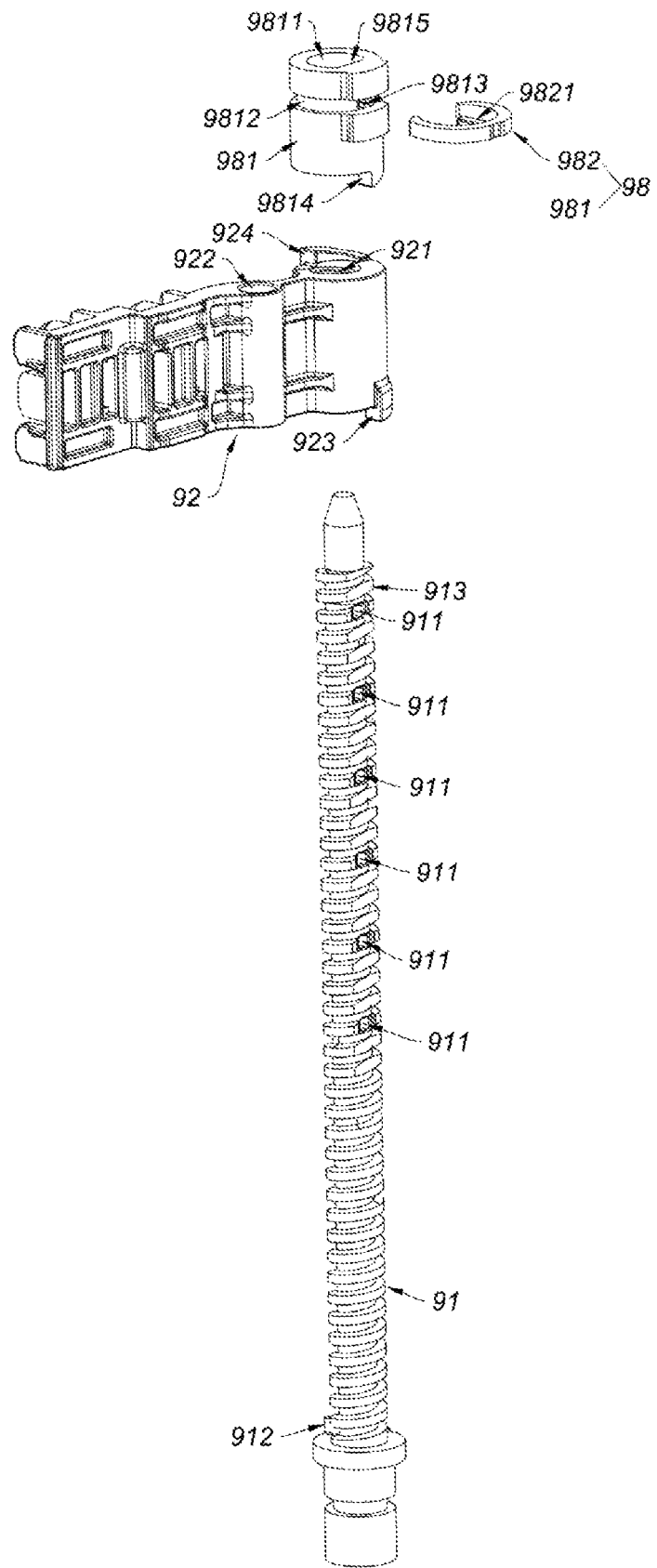
FIG. 8 is a structure diagram of mounting and dismounting a sliding block, a limiting assembly and a screw in embodiment 1.

In order to facilitate aligned mounting, and make it easier to assemble the screw drive mechanism 9, as shown in FIG. 7 and FIG. 8, a cut surface 913 is formed on the outer circumferential surface of the screw 91. The pin hole 911 is formed on the cut surface 913 of the screw 91. The sheathing hole 9811 of the sheathing component 981 is an irregularly-shaped hole with a plane 9815, the through hole 9813 of the sheathing component 981 penetrates the plane 9815 in the sheathing hole 9811, and the plane 9815 in the sheathing hole 9811 of the sheathing component 981 is wedged with the cut surface 913 of the screw 91.

In order to enable the multi-frequency and multi-beam independent electrically adjustable antenna to have a more compact structure, the multi-frequency and multi-beam independent electrically adjustable antenna also includes a main control module 50. The drive units of the screw drive mechanism 9 for driving the first push component D1 81 to slide relative to the mounting plate 3, the screw drive mechanism for driving the second push component D2 82 to slide relative to the mounting plate 3, the screw drive mechanism for driving the third push component D3 83 to slide relative to the mounting plate 3, the screw drive mechanism for driving the fourth push component D4 84 to slide relative to the mounting plate 3, the screw drive mechanism for driving the fifth push component D5 85 to slide relative to the mounting plate 3, and the screw drive mechanism for driving the sixth push component D6 86 to slide relative to the mounting plate 3 are all electrically connected with the main control module 50. The main control module 50, the screw drive mechanism 9 for driving the first push component D1 81 to slide relative to the mounting plate 3, the screw drive mechanism for driving the second push component D2 82 to slide relative to the mounting plate 3, the screw drive mechanism for driving the third push component D3 83 to slide relative to the mounting plate 3, the screw drive mechanism for driving the fourth push component D4 84 to slide relative to the mounting plate 3, the screw drive mechanism for driving the fifth push component D5 85 to slide relative to the mounting plate 3, and the screw drive mechanism for driving the sixth push component D6 86 to slide relative to the mounting plate 3 constitute a module with a volume of 3100 cm$^3$.

Figure 3:
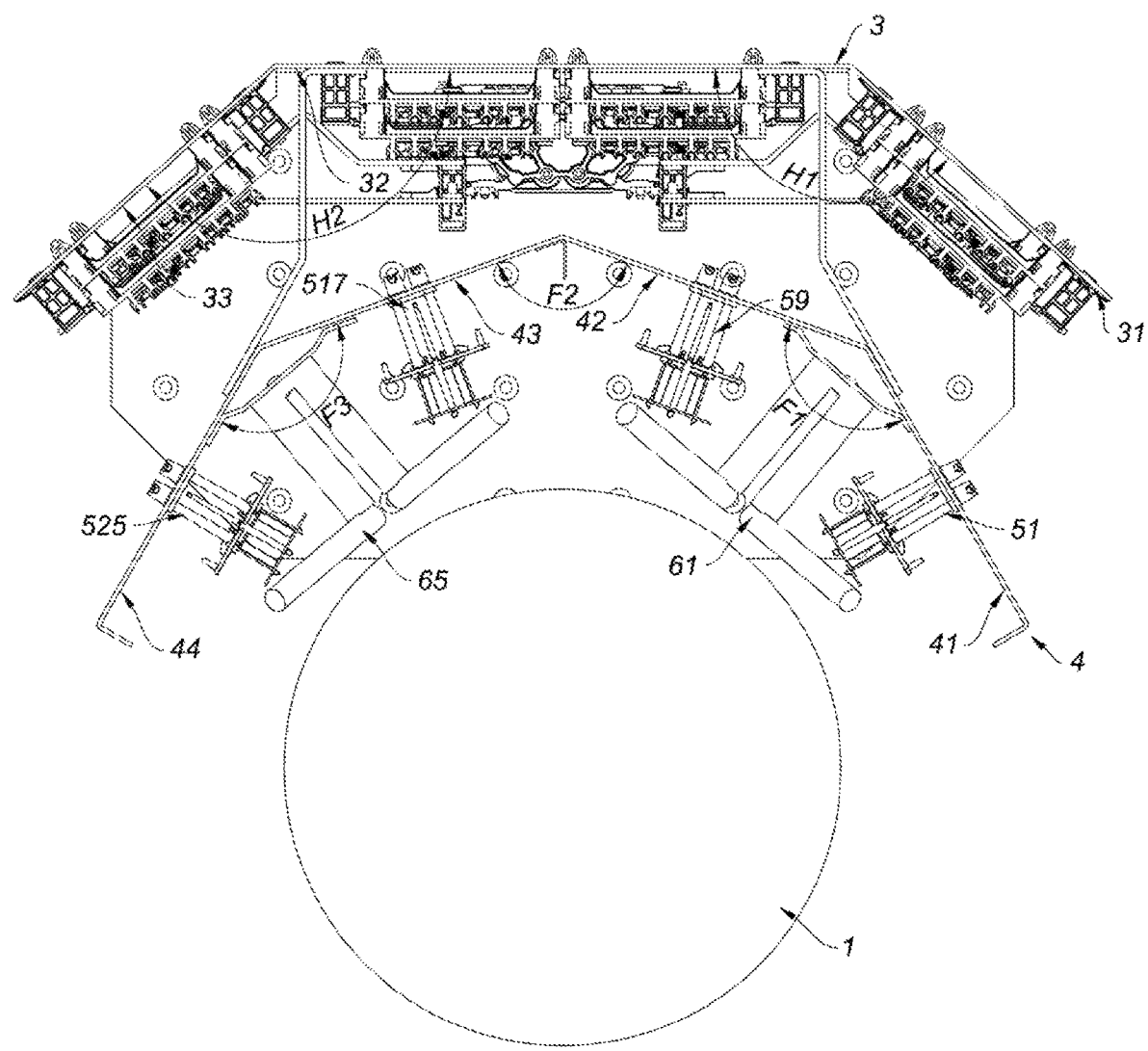
FIG. 3 is a top structure diagram of embodiment 1 with the outer shell removed.
Figure 4:
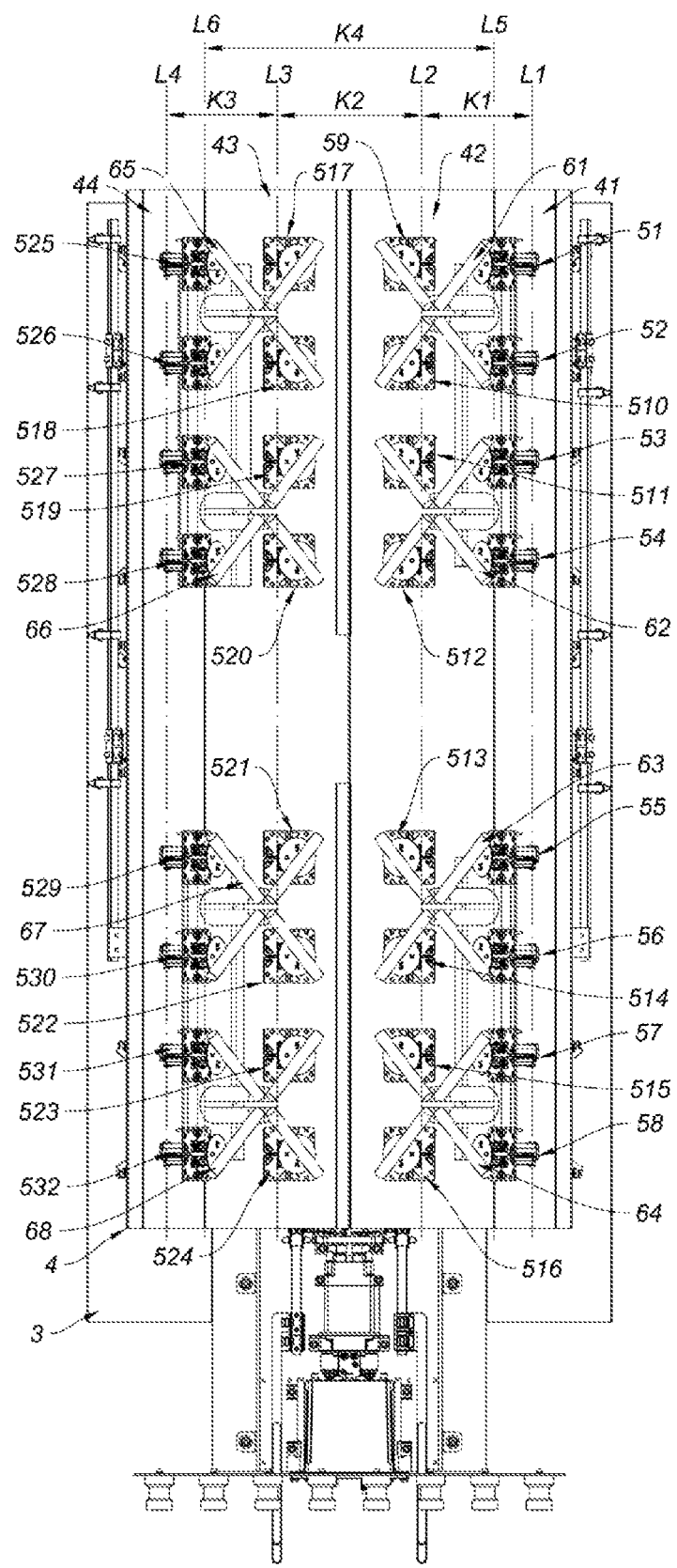
FIG. 4 is a front structure diagram of embodiment 1 with the outer shell, the first electromagnetic lens and the second electromagnetic lens removed.

In order to enable the multi-frequency and multi-beam independent electrically adjustable antenna to cover a wider area when used, as shown in FIG. 3, the first reflecting surface 41 and the second reflecting surface 42 form an angle F1 of 140°, the second reflecting surface 42 and the third reflecting surface 43 form an angle F2 of 140°, and the third reflecting surface 43 and the fourth reflecting surface 44 form an angle F3 of 140°. This design makes the beams of the sectors have different directions, so as to meet requirements for environment coverage.

In order to achieve a more reasonable mounting of the first phase shifter C1 71, the second phase shifter C2 72, the third phase shifter C3 73, the fourth phase shifter C4 74, the fifth phase shifter C5 75, the sixth phase shifter C6 76, the seventh phase shifter C7 77, the eighth phase shifter C8 78, the ninth phase shifter C9 79, the tenth phase shifter C10 710, the eleventh phase shifter C11 711 and the twelfth phase shifter C12 712, as shown in FIG. 3, the mounting plate 3 is bent to form a first mounting surface 31, a second mounting surface 32 and a third mounting surface 33. Each of the first mounting surface 31, the second mounting surface 32, and the third mounting surface 33 is set to face the reflecting plate 4. The first mounting surface 31 and the second mounting surface 32 form an angle H1 of 138°, and the second mounting surface 32 and the third mounting surface 33 form an angle H2 of 138°. The first phase shifter C1 71, the second phase shifter C2 72, the ninth phase shifter C9 79 and the tenth phase shifter C10 710 are all mounted on the first mounting surface 31, the third phase shifter C3 73, the fourth phase shifter C4 74, the fifth phase shifter C5 75 and the sixth phase shifter C6 76 are all mounted on the second mounting surface 32, and the seventh phase shifter C7 77, the eighth phase shifter C8 78, the eleventh phase shifter C11 711 and the twelfth phase shifter C12 712 are all mounted on the third mounting surface 33.

In order to prevent dust and moisture, as shown in FIG. 1, the multi-frequency and multi-beam independent electrically adjustable antenna further includes an outer shell 10. The outer shell 10 includes a cylindrical component 101, a first end cover 102 and a second end cover 103. The first end cover 102 is covered and fixed on one opening of the cylindrical component 101, and the second end cover 103 is covered and fixed on the other opening of the cylindrical component 101, so that the first end cover 102, the cylindrical component 101 and the second end cover 103 constitute a chamber; the first electromagnetic lens 1, the second electromagnetic lens 2, the mounting plate 3, the reflecting plate 4, the oscillator units A1 51 to A32 532, thirty-third to fortieth the oscillator units B1 61 to B8 68, the first phase shifters C1 71 to C12 712, and the screw drive mechanism 9 are all mounted in the chamber. The scale 97 on the screw drive mechanism 9 extends out of the chamber through the first end cover 102.

In order to enable the multi-frequency and multi-beam independent electrically adjustable antenna to have a more reasonable drive structure, as shown in FIG. 5, a first pull component G1 811 and a second pull component G2 812 are fixed on the first push component D1 81, a third pull component G3 821 and a fourth pull component G4 822 are fixed on the second push component D2 82, a fifth pull component G5 831 and a sixth pull component G6 832 are fixed on the third push component D3 83, a seventh pull component G7 841 and a eighth pull component G8 842 are fixed on the fourth push component D4 84, a ninth pull component G9 851 and a tenth pull component G10 852 are fixed on the fifth push component D5 85, and a eleventh pull component G11 861 and a twelfth pull component G12 862 are fixed on the sixth push component D6 86. Each of the first to twelfth pull components G1 811 to G12 862 is provided with an elongated hole. The elongated hole on the first pull component G1 811 is nested with the cylinder on the sliding block of the first phase shifter C1 71. The elongated hole on the second pull component G2 812 is nested with the cylinder on the sliding block of the second phase shifter C2 72. The elongated hole on the third pull component G3 821 is nested with the cylinder on the sliding block of the third phase shifter C3 73. The elongated hole on the fourth pull component G4 822 is nested with the cylinder on the sliding block of the fourth phase shifter C4 74. The elongated hole on the fifth pull component G5 831 is nested with the cylinder on the sliding block of the fifth phase shifter C5 75. The elongated hole on the sixth pull component G6 832 is nested with the cylinder on the sliding block of the sixth phase shifter C6 76. The elongated hole on the seventh pull component G7 841 is nested with the cylinder on the sliding block of the seventh phase shifter C7 77. The elongated hole on the eighth pull component G8 842 is nested with the cylinder on the sliding block of the eighth phase shifter C8 78. The elongated hole on the ninth pull component G9 851 is nested with the cylinder on the sliding block of the ninth phase shifter C9 79; the elongated hole on the tenth pull component G10 852 is nested with the cylinder on the sliding block of the tenth phase shifter C10 710. The elongated hole on the eleventh pull component G11 861 is nested with the cylinder on the sliding block of the eleventh phase shifter C11 711. The elongated hole on the twelfth pull component G12 862 is nested with the cylinder on the sliding block of the twelfth phase shifter C12 712.

Embodiment 2

Figure 9:
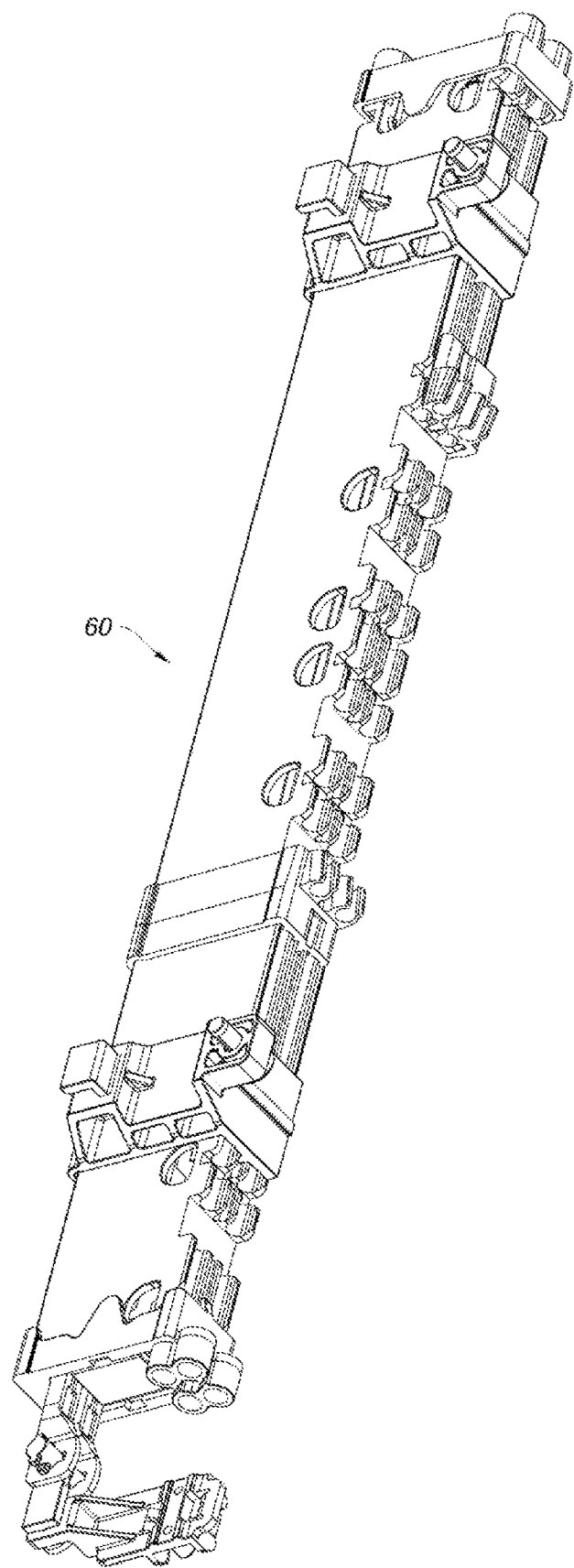
FIG. 9 is a structure diagram of a phase shifter in embodiment 2.

The difference between this embodiment and embodiment 1 is that: the first phase shifter C1 71, the second phase shifter C2 72, the third phase shifter C3 73, the fourth phase shifter C4 74, the fifth phase shifter C5 75, the sixth phase shifter C6 76, the seventh phase shifter C7 77, the eighth phase shifter C8 78, the ninth phase shifter C9 79, the tenth phase shifter C10 710, the eleventh phase shifter C11 711 and the twelfth phase shifter C12 712 in this embodiment are all the metal cavity phase shifters 60 as shown in FIG. 9. As compared with a PCB sliding sector phase shifter used in embodiment 1, a metal cavity phase shifter 60 involves better performance indicators of antennas when used. In practical applications of this embodiment, because the structure of such metal cavity phase shifter 60 is different from that of such PCB sliding sector phase shifter, the drive structure between the screw drive mechanism and the metal cavity phase shifter 60 will also be changed accordingly. This change is just a simple transformation due to the change of the structure of the phase shifter, so elaborations are omitted herein. Moreover, in order to facilitate linkage and save space, two metal cavity phase shifters 60 linked simultaneously can be stacked together for mounting during use.

What is claimed is:

1. A multi-frequency and multi-beam independent electrically adjustable antenna, comprising: a first electromagnetic lens, a second electromagnetic lens, a mounting plate, a reflecting plate, a first oscillator unit to a thirty-second oscillator unit, a thirty-third oscillator unit to a fortieth oscillator unit, and a first phase shifter to a twelfth phase shifter; wherein,
the reflecting plate is bent to form a first reflecting surface, a second reflecting surface, a third reflecting surface and a fourth reflecting surface, the first reflecting surface, the second reflecting surface, the third reflecting surface and the fourth reflecting surface are successively connected to form a wrap angle;
the first electromagnetic lens and the second electromagnetic lens are both cylindrical lenses, the first electromagnetic lens and the second electromagnetic lens are both partially positioned in the wrap angle, and a central axis of the first electromagnetic lens is collinear with a central axis of the second electromagnetic lens;
the first electromagnetic lens, the second electromagnetic lens, the reflecting plate and the mounting plate are fixed relative to each other, and the mounting plate is on a side of the reflecting plate facing away from the first electromagnetic lens and the second electromagnetic lens;
the first oscillator unit to the thirty-second oscillator unit are oscillators with a same operating frequency, and the thirty-third oscillator unit to the fortieth oscillator unit are oscillators with a same operating frequency; wherein the operating frequency of each of the first oscillator unit to the thirty-second oscillator unit is higher than the operating frequency of each of the thirty-third oscillator unit to the fortieth oscillator unit;
the first oscillator unit to the eighth oscillator unit are all mounted on the first reflecting surface, the first oscillator unit to the eighth oscillator unit are arranged in sequence along a first straight line, each of the first oscillator unit to the fourth oscillator unit is set to have a signal receiving and transmitting direction towards the first electromagnetic lens and perpendicular to the central axis of the first electromagnetic lens, and each of the fifth oscillator unit to the eighth oscillator unit is set to have a signal receiving and transmitting direction towards the second electromagnetic lens and perpendicular to the central axis of the second electromagnetic lens;

the ninth oscillator unit to the sixteenth oscillator unit are all mounted on the second reflecting surface, the ninth oscillator unit to the sixteenth oscillator unit are arranged in sequence along a second straight line, each of the ninth oscillator unit to the twelfth oscillator unit is set to have a signal receiving and transmitting direction towards the first electromagnetic lens and perpendicular to the central axis of the first electromagnetic lens, and each of the thirteenth oscillator unit to the sixteenth oscillator unit is set to have a signal receiving and transmitting direction towards the second electromagnetic lens and perpendicular to the central axis of the second electromagnetic lens;

the seventeenth oscillator unit to the twenty-fourth oscillator unit are all mounted on the third reflecting surface, the seventeenth oscillator unit to the twenty-fourth oscillator unit are arranged in sequence along a third straight line, each of the seventeenth oscillator unit to the twentieth oscillator unit is set to have a signal receiving and transmitting direction towards the first electromagnetic lens and perpendicular to the central axis of the first electromagnetic lens, and each of the twenty-first oscillator unit to the twenty-fourth oscillator unit is set to have a signal receiving and transmitting direction towards the second electromagnetic lens and perpendicular to the central axis of the second electromagnetic lens;

the twenty-fifth oscillator unit to the thirty-second oscillator unit are all mounted on the fourth reflecting surface, the twenty-fifth oscillator unit to the thirty-second oscillator unit are arranged in sequence along a fourth straight line, each of the twenty-fifth oscillator unit to the twenty-eighth oscillator unit is set to have a signal receiving and transmitting direction towards the first electromagnetic lens and perpendicular to the central axis of the first electromagnetic lens, and each of the twenty-ninth oscillator unit to the thirty-second oscillator unit is set to have a signal receiving and transmitting direction towards the second electromagnetic lens and perpendicular to the central axis of the second electromagnetic lens;

the thirty-third oscillator unit to thirty-sixth oscillator unit are all mounted on the reflecting plate, the thirty-third oscillator unit to thirty-sixth oscillator unit are arranged in sequence along a first side formed by connecting the first reflecting surface and the second reflecting surface, and each of the thirty-third oscillator unit and thirty-fourth oscillator unit is set to have a signal receiving and transmitting direction towards the first electromagnetic lens and perpendicular to the central axis of the first electromagnetic lens, and each of the thirty-fifth oscillator unit and thirty-sixth oscillator unit is set to have a signal receiving and transmitting direction towards the second electromagnetic lens and perpendicular to the central axis of the second electromagnetic lens;

the thirty-seventh oscillator unit to fortieth oscillator unit are all mounted on the reflecting plate, the thirty-seventh oscillator unit to fortieth oscillator unit are arranged in sequence along a second side formed by connecting the third reflecting surface and the fourth reflecting surface, the first, second, third and fourth straight lines and the first and second sides are all parallel to the central axis of the first electromagnetic lens, and each of the thirty-seventh oscillator unit and thirty-eighth oscillator unit is set to have a signal receiving and transmitting direction towards the first electromagnetic lens and perpendicular to the central axis of the first electromagnetic lens, and each of the thirty-ninth oscillator unit and fortieth oscillator unit is set to have a signal receiving and transmitting direction towards the second electromagnetic lens and perpendicular to the central axis of the second electromagnetic lens;

the first phase shifter to the twelfth phase shifter are all mounted on the mounting plate, the first oscillator unit to the fourth oscillator unit are all electrically connected to an output end of the first phase shifter to form 2 Transmit 2 Receive (2T2R), the fifth oscillator unit to the eighth oscillator unit are all electrically connected to an output end of the second phase shifter to form 2T2R, so that the first oscillator unit to the eighth oscillator unit form 4 Transmit 4 Receive (4T4R); the ninth oscillator unit to the twelfth oscillator unit are all electrically connected to an output end of the third phase shifter to form 2T2R, the thirteenth oscillator unit to the sixteenth oscillator unit are all electrically connected to an output end of the fourth phase shifter to form 2T2R, so that the ninth oscillator unit to the sixteenth oscillator unit form 4T4R; the seventeenth oscillator unit to the twentieth oscillator unit are all electrically connected to an output end of the fifth phase shifter to form 2T2R, the twenty-first oscillator unit to the twenty-fourth oscillator unit are all electrically connected to an output end of the sixth phase shifter to form 2T2R, so that the seventeenth oscillator unit to the twenty-fourth oscillator unit form 4T4R; the twenty-fifth oscillator unit to the twenty-eighth oscillator unit are all electrically connected to an output end of the seventh phase shifter to form 2T2R, the twenty-ninth oscillator unit to the thirty-second oscillator unit are all electrically connected to an output end of the eighth phase shifter to form 2T2R, so that the twenty-fifth oscillator unit to the thirty-second oscillator unit form 4T4R; the thirty-third oscillator unit and thirty-fourth oscillator unit are both electrically connected to an output end of the ninth phase shifter to form 2T2R, the thirty-fifth oscillator unit and thirty-sixth oscillator unit are both electrically connected to an output end of the tenth phase shifter to form 2T2R, so that the thirty-third oscillator unit to thirty-sixth oscillator unit form 4T4R; the thirty-seventh oscillator unit and thirty-eighth oscillator unit are both electrically connected to an output end of the eleventh phase shifter to form 2T2R, the thirty-ninth oscillator unit and fortieth oscillator unit are both electrically connected to an output end of the twelfth phase shifter to form 2T2R, so that thirty-seventh oscillator unit to fortieth oscillator unit form 4T4R;

the first phase shifter is linked with the second phase shifter through a first push component; the third phase shifter is linked with the fourth phase shifter through a second push component; the fifth phase shifter is linked with the sixth phase shifter through a third push component; the seventh phase shifter is linked with the eighth phase shifter through a fourth push component;

the ninth phase shifter is linked with the tenth phase shifter through a fifth push component; the eleventh phase shifter is linked with the twelfth phase shifter through a sixth push component;

the first push component, the second push component, the third push component, the fourth push component, the fifth push component and the sixth push component are all slidably mounted on the mounting plate; a sliding direction of each of the first push component, the second push component, the third push component, the fourth push component, the fifth push component and the sixth push component relative to the mounting plate is parallel to the central axis of the first electromagnetic lens; each of the first push component, the second push component, the third push component, the fourth push component, the fifth push component and the sixth push component is driven by a separate screw drive mechanism to slide relative to the mounting plate; each screw drive mechanism comprises a screw, a sliding block, a guide rod and a drive unit; both ends of the screw are rotationally mounted on the mounting plate, and a central axis of the screw is parallel to the central axis of the first electromagnetic lens; both ends of the guide rod are mounted on the mounting plate, and a central axis of the guide rod is parallel to the central axis of the screw; a screw hole and a guide hole are formed on the sliding block, the screw hole of the sliding block is connected to threads of the screw, and the guide hole of the sliding block is fitted with the guide rod; the drive unit is mounted on the mounting plate and used to drive the screw to rotate; each of the first push component, the second push component, the third push component, the fourth push component, the fifth push component and the sixth push component is connected with a sliding block of its corresponding screw drive mechanism;

the screw drive mechanism further comprises a limiting assembly, the limiting assembly comprises a sheathing component and a clamping component, the sheathing component is provided with a sheathing hole, a clamping ring groove is formed on an outer circumferential surface of the sheathing component, the sheathing component is further provided with a through hole connecting the clamping ring groove to the wall of the sheathing hole, and the sheathing component is sheathed on the screw through its sheathing hole; a plurality of pin holes are set on the screw, and the plurality of pin holes are arranged along the axis of the screw; the clamping component is a semi-enclosed ring-shaped component, a locating pin is formed on the inner surface of the clamping component, the clamping component is clamped in the clamping ring groove of the sheathing component, and a locating pin of the clamping component is inserted through the through hole of the sheathing component into the pin hole of the screw; a first blocking part is arranged on the screw, and the sliding block is positioned between the limiting assembly and the first blocking part; a second blocking part is formed on an end face of the sheathing component facing the sliding block, and a first pressing-against part cooperating with the first blocking part is formed on an end face of the sliding block facing the first blocking part, and a second pressing-against part cooperating with the second blocking part is formed on an end face of the sliding block facing the sheathing component.

2. The multi-frequency and multi-beam independent electrically adjustable antenna according to claim 1, wherein a connecting rod is also mounted on the sliding block of the screw drive mechanism; the connecting rod is slidably mounted on the mounting plate, and a sliding direction of the connecting rod relative to the mounting plate is parallel to the central axis of the first electromagnetic lens; one end of each of the first to sixth push components is connected to one end of the connecting rod of its corresponding screw drive mechanism through a connector, and the other end of the connecting rod is connected to a scale.

3. The multi-frequency and multi-beam independent electrically adjustable antenna according to claim 1, wherein a cut surface is formed on the outer circumferential surface of the screw, and the pin hole is formed on the cut surface of the screw; the sheathing hole of the sheathing component is an irregularly-shaped hole with a plane, the through hole of the sheathing component penetrates the plane in the sheathing hole, and the plane in the sheathing hole of the sheathing component is wedged with the cut surface of the screw.

4. The multi-frequency and multi-beam independent electrically adjustable antenna according to claim 1, further comprising a main control module, wherein the drive units of the screw drive mechanism for driving the first push component to slide relative to the mounting plate, the screw drive mechanism for driving the second push component to slide relative to the mounting plate, the screw drive mechanism for driving the third push component to slide relative to the mounting plate, the screw drive mechanism for driving the fourth push component to slide relative to the mounting plate, the screw drive mechanism for driving the fifth push component to slide relative to the mounting plate, and the screw drive mechanism for driving the sixth push component to slide relative to the mounting plate are all electrically connected to the main control module; the main control module, the screw drive mechanism for driving the first push component to slide relative to the mounting plate, the screw drive mechanism for driving the second push component to slide relative to the mounting plate, the screw drive mechanism for driving the third push component to slide relative to the mounting plate, the screw drive mechanism for driving the fourth push component to slide relative to the mounting plate, the screw drive mechanism for driving the fifth push component to slide relative to the mounting plate, and the screw drive mechanism for driving the sixth push component to slide relative to the mounting plate constitute a module with a volume of 3000 $cm^3$ to 3200 $cm^3$.

5. The multi-frequency and multi-beam independent electrically adjustable antenna according to claim 1, wherein each of the first oscillator unit to the thirty-second oscillator unit has an operating frequency of 1710 MHz to 2610 MHz, and each of the thirty-third oscillator unit to the fortieth oscillator unit has an operating frequency of 698 MHZ to 960 MHz.

6. The multi-frequency and multi-beam independent electrically adjustable antenna according to claim 1, wherein the first reflecting surface and the second reflecting surface form an angle F1 of 1300 to 150°, the second reflecting surface and the third reflecting surface form an angle F2 of 130° to 150°, and the third reflecting surface and the fourth reflecting surface form an angle F3 of 130° to 150°.

7. The multi-frequency and multi-beam independent electrically adjustable antenna according to claim 6, wherein the first straight line and the second straight line have a spacing K1 of 110±5 mm, the second straight line and the third straight line have a spacing K2 of 140±5 mm, the third straight line and the fourth straight line have a spacing K3 of 110±5 mm, and the first side and the second side have a spacing K4 of 290±5 mm.

8. The multi-frequency and multi-beam independent electrically adjustable antenna according to claim 1, wherein the mounting plate is bent to form a first mounting surface, a second mounting surface and a third mounting surface; each of the first mounting surface, the second mounting surface, and the third mounting surface is set to face the reflecting plate; the first mounting surface and the second mounting surface form an angle H1 of 130° to 150°, and the second mounting surface and the third mounting surface form an angle H2 of 130° to 150°; the first, second, ninth and tenth phase shifters are all mounted on the first mounting surface, the third, fourth, fifth and sixth phase shifters are all mounted on the second mounting surface, and the seventh, eighth, eleventh and twelfth phase shifters are all mounted on the third mounting surface.

\* \* \* \* \*